(12) United States Patent
Murakami et al.

(10) Patent No.: US 9,276,496 B2
(45) Date of Patent: Mar. 1, 2016

(54) POWER CONVERSION APPARATUS INCLUDING AN INVERTER-CONVERTER COMBINATION

(75) Inventors: Satoshi Murakami, Tokyo (JP); Masaki Yamada, Tokyo (JP); Takashi Kaneyama, Tokyo (JP); Kazutoshi Awane, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 341 days.

(21) Appl. No.: 13/699,815

(22) PCT Filed: Oct. 26, 2010

(86) PCT No.: PCT/JP2010/068902
§ 371 (c)(1),
(2), (4) Date: Nov. 26, 2012

(87) PCT Pub. No.: WO2011/148526
PCT Pub. Date: Dec. 1, 2011

(65) Prior Publication Data
US 2013/0121045 A1 May 16, 2013

(30) Foreign Application Priority Data
May 28, 2010 (JP) .................................. 2010-122239

(51) Int. Cl.
H02M 7/219 (2006.01)
H02M 7/49 (2007.01)
H02M 7/483 (2007.01)

(52) U.S. Cl.
CPC ............... *H02M 7/219* (2013.01); *H02M 7/49* (2013.01); *H02M 2007/4835* (2013.01)

(58) Field of Classification Search
CPC ..................... H02M 2007/4835; H02M 7/219; H02M 7/49
USPC ............ 323/242, 268, 271, 285, 288; 363/16, 363/34, 40, 41, 71, 95, 97, 125, 131
See application file for complete search history.

(56) References Cited

U.S. PATENT DOCUMENTS

2006/0203528 A1* 9/2006 Miyazaki ............... H02M 1/32
363/131
2007/0159279 A1* 7/2007 Shimada et al. ................ 335/40
(Continued)

FOREIGN PATENT DOCUMENTS

JP 2007 202251 8/2007
JP 2009 95160 4/2009
(Continued)

OTHER PUBLICATIONS

International Search Report Issued Jan. 25, 2011 in PCT/JP10/68902 Filed Oct. 26, 2010.
U.S. Appl. No. 13/696,764, filed Nov. 7, 2012, Yamada, et al.

*Primary Examiner* — Jue Zhang
*Assistant Examiner* — Lakaisha Jackson
(74) *Attorney, Agent, or Firm* — Oblon, McClelland, Maier & Neustadt, L.L.P.

(57) ABSTRACT

An inverter circuit is connected in series to an AC power supply, and at the subsequent stage, a smoothing capacitor is connected via a converter circuit including semiconductor switching devices. A control circuit controls the converter circuit by providing a short-circuit period for bypassing the smoothing capacitor in each cycle, and controls the inverter circuit to improve the power factor of the AC power supply by using a current instruction such that the voltage of the smoothing capacitor becomes a target voltage. When the voltage of a DC voltage source of the inverter circuit has exceeded a predetermined upper limit, the control circuit increases the current instruction to control the inverter circuit, thereby increasing the discharge amount of the DC voltage source. Thus, even if the voltage variation of the DC voltage source of the inverter circuit increases, it is possible to stably continue the control.

16 Claims, 24 Drawing Sheets

(56) References Cited

U.S. PATENT DOCUMENTS

| | | |
|---|---|---|
| 2009/0116268 A1 | 5/2009 | Kishida et al. |
| 2011/0127838 A1* | 6/2011 | Awane et al. ................... 307/75 |
| 2011/0215651 A1* | 9/2011 | Yamada et al. ................. 307/75 |
| 2012/0014139 A1* | 1/2012 | Yamada .............. H02M 1/4208 363/17 |

FOREIGN PATENT DOCUMENTS

| | | |
|---|---|---|
| WO | 2007 129456 | 11/2007 |
| WO | 2011 128941 | 10/2011 |
| WO | 2011 128942 | 10/2011 |

* cited by examiner

POWER CONVERSION APPARATUS INCLUDING AN INVERTER-CONVERTER COMBINATION

TECHNICAL FIELD

The present invention relates to a power conversion apparatus which superimposes the AC-side output of a single-phase inverter onto a power supply output to obtain a desired DC voltage.

BACKGROUND ART

In a conventional power conversion apparatus, an output from a first terminal of an AC power supply is connected to a reactor, and at the subsequent stage of the reactor, the AC side of an inverter circuit composed of a single-phase inverter is connected in series. The single-phase inverter in the inverter circuit is composed of a semiconductor switching device and a DC voltage source. In addition, first and second series circuits connected in parallel, each of which is composed of a short-circuit switch and a rectification diode connected in series to form an inverter, are connected between both terminals of a smoothing capacitor at the output stage. The middle point of the first series circuit is connected to an AC output line at the subsequent stage of the inverter circuit, and the middle point of the second series circuit is connected to a second terminal of the AC power supply. A current is controlled and outputted by PWM control such that a DC voltage of the smoothing capacitor can be maintained at a constant target voltage and the input power factor from the AC power supply is about 1, and a voltage generated on the AC side is superimposed onto an input voltage from the AC power supply. The short-circuit switch is turned on to bypass the smoothing capacitor, only in a short-circuit phase range centered at a zero cross phase of the phase of the input voltage from the AC power supply (for example, see Patent Document 1).

CITATION LIST

Patent Document

Patent Document 1: Japanese Laid-Open Patent Publication No. 2009-095160

SUMMARY OF THE INVENTION

Problems to be Solved by the Invention

In such a power conversion apparatus, the DC voltage source of the inverter circuit is switched between charge and discharge through ON/OFF switching of the short-circuit switch, to keep the voltage of the DC voltage source, and the inverter circuit is subjected to output control so as to control the current. However, the following problem arises. That is, if the voltage of the DC voltage source of the inverter circuit greatly varies, the current control by the inverter circuit cannot be performed, and also, the voltage of the DC voltage source cannot be recovered. As a result, it is impossible to continue the control operation of the power conversion apparatus for outputting a desired voltage to the smoothing capacitor.

The present invention has been made to solve the above problem. An object of the present invention is to, even if the voltage of the DC voltage source transiently and greatly varies, promptly recover the voltage of the DC voltage source, thereby stably continuing the current control by the inverter circuit and the voltage control for outputting a desired voltage to the smoothing capacitor.

Solution to the Problems

A first power conversion apparatus according to the present invention comprises: an inverter circuit composed of one or more single-phase inverters whose AC sides are connected in series and each of which is composed of a plurality of semiconductor switching devices and a DC voltage source, the AC sides being connected in series to a first terminal of a power supply, the inverter circuit superimposing the sum of outputs of the single-phase inverters onto an output of the power supply; a converter circuit having a plurality of switches between DC bus lines, one of AC terminals of the converter circuit being connected to an AC output line at a subsequent stage of the inverter circuit, and the other one of the AC terminals being connected to a second terminal of the power supply, the converter circuit outputting DC power between the DC bus lines; a smoothing capacitor, connected between the DC bus lines, which smoothes an output of the converter circuit; and a control circuit which performs output control for the converter circuit so as to cause the voltage of the DC voltage supply of the inverter circuit to follow an instruction value, by providing a short-circuit period for short-circuiting the AC terminals of the converter circuit to bypass the smoothing capacitor, and which performs output control for the inverter circuit so as to cause the voltage of the smoothing capacitor to follow a target voltage, by using a current instruction. In power running operation for outputting power to the smoothing capacitor, the control circuit controls the converter circuit such that the DC voltage source of the inverter circuit is charged in the short-circuit period, and that the short-circuit period increases as the voltage of the DC voltage source decreases and the short-circuit period decreases as the voltage of the DC voltage source increases. When the voltage of the DC voltage source of the inverter circuit has exceeded a predetermined upper limit value, the control circuit changes the control for the inverter circuit from that for stationary state, thereby increasing the discharge amount of the DC voltage source.

A second power conversion apparatus according to the present invention comprises: an inverter circuit composed of one or more single-phase inverters whose AC sides are connected in series and each of which is composed of a plurality of semiconductor switching devices and a DC voltage source, the AC sides being connected in series to a first terminal of a AC power supply, the inverter circuit superimposing the sum of outputs of the single-phase inverters onto an output of the AC power supply; a converter circuit having a plurality of switches between DC bus lines, one of AC terminals of the converter circuit being connected to an AC output line at a subsequent stage of the inverter circuit, and the other one of the AC terminals being connected to a second terminal of the AC power supply, the converter circuit outputting DC power between the DC bus lines; a smoothing capacitor, connected between the DC bus lines, which smoothes an output of the converter circuit; and a control circuit which performs output control for the converter circuit so as to cause the voltage of the DC voltage supply of the inverter circuit to follow an instruction value, by providing a short-circuit period for short-circuiting the AC terminals of the converter circuit to bypass the smoothing capacitor, and which performs output control for the inverter circuit so as to cause the voltage of the smoothing capacitor to follow a target voltage, by using a current instruction. In power running operation for outputting power to the smoothing capacitor, the control circuit controls the converter circuit such that the DC voltage source of the inverter circuit is charged in the short-circuit period, and that the short-circuit period increases as the voltage of the DC voltage source of the inverter circuit decreases and the short-circuit period decreases as the voltage of the DC voltage source increases. In the power running operation, when the voltage of the DC voltage source has decreased to be out of a predetermined voltage condition for enabling control for the inverter circuit using the current instruction, the control circuit restricts the AC terminals of the converter circuit from being short-circuited, and when the voltage of the DC voltage source has further decreased to be equal to or lower than a predetermined lower limit value, the control circuit releases the short-circuit restriction of the AC terminals, thereby charging the DC voltage source.

Effect of the Invention

According to the above first power conversion apparatus, when the voltage of the DC voltage source of the inverter circuit has exceeded the predetermined upper limit value, the control circuit changes the control for the inverter circuit from that for stationary state, thereby increasing the discharge amount of the DC voltage source. Thus, it is possible to promptly recover the voltage of the DC voltage source of the inverter circuit. Therefore, it is possible to promptly recover the current control for the stationary state in the inverter circuit, thereby stably continuing the voltage control for outputting a desired voltage to the smoothing capacitor.

According to the above second power conversion apparatus, in the power running operation, when the voltage of the DC voltage source has decreased to be out of the predetermined voltage condition for enabling control for the inverter circuit using the current instruction, the control circuit restricts the AC terminals of the converter circuit from being short-circuited, and when the voltage of the DC voltage source has further decreased to be equal to or lower than the predetermined lower limit value, the control circuit releases the short-circuit restriction of the AC terminals, thereby charging the DC voltage source. Thus, it is possible to promptly recover the voltage of the DC voltage source of the inverter circuit and to promptly recover the current control for the stationary state in the inverter circuit, thereby stably continuing the voltage control for outputting a desired voltage to the smoothing capacitor.

EMBODIMENTS OF THE INVENTION

Embodiment 1

Hereinafter, a power conversion apparatus according to embodiment 1 of the present invention will be described. FIG.

1 is a schematic configuration diagram of the power conversion apparatus according to embodiment 1 of the present invention.

Figure 1:
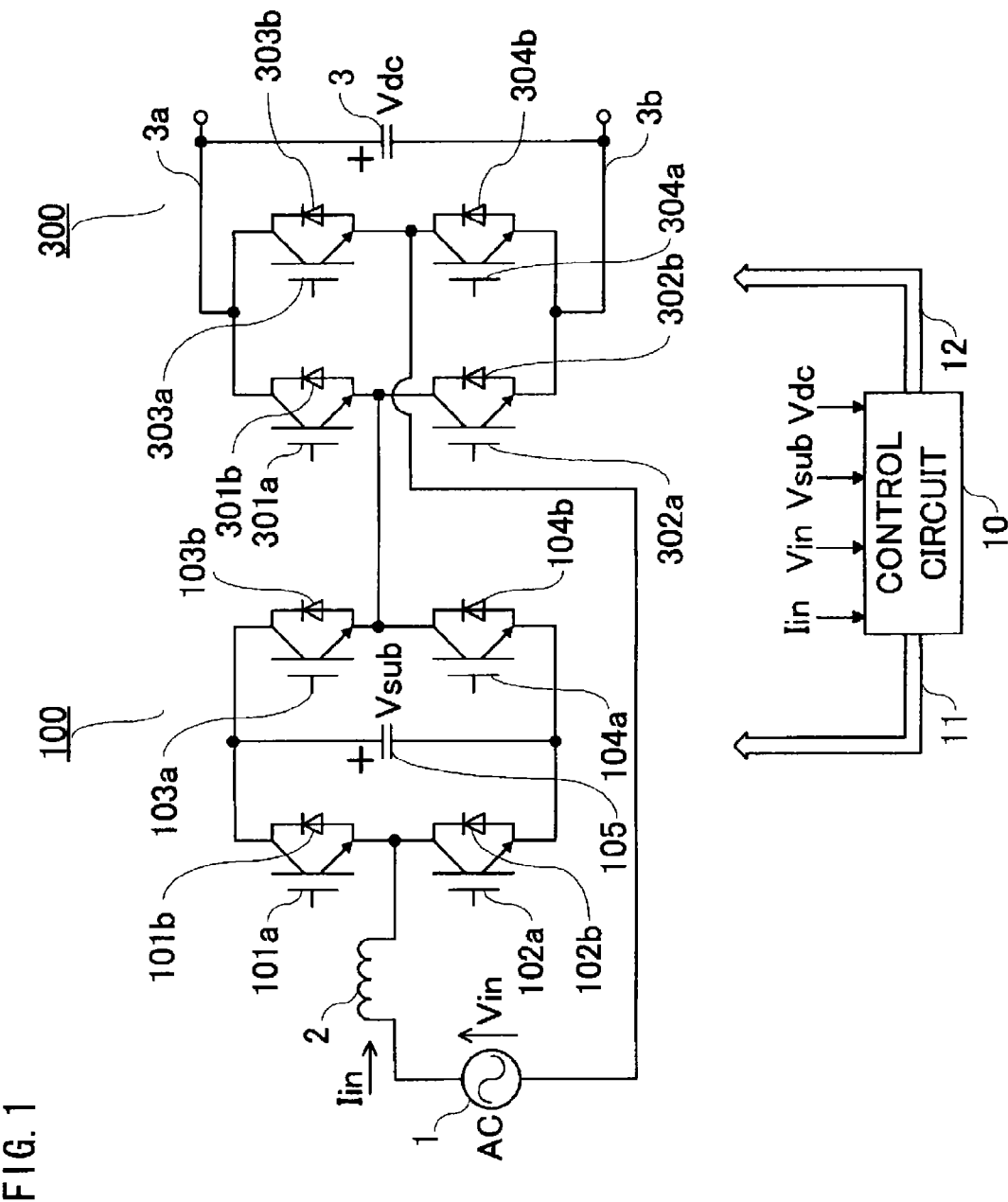
FIG. 1 is a configuration diagram of a power conversion apparatus according to embodiment 1 of the present invention.

As shown in FIG. 1, the power conversion apparatus comprises a main circuit and a control circuit 10, for converting AC power of an AC power supply 1 to DC power and outputting the DC power.

The main circuit comprises a reactor 2 as a current-limiting circuit, an inverter circuit 100, a converter circuit 300, and a smoothing capacitor 3. An output from a first terminal of the AC power supply 1 is connected to the reactor 2, and the AC side of the inverter circuit 100 composed of a single-phase inverter is connected in series at the subsequent stage of the reactor 2. One of the AC terminals of the converter circuit 300 is connected to an AC output line at the subsequent stage of the inverter circuit 100, and the other one is connected to a second terminal of the AC power supply 1. The converter circuit 300 outputs DC power to the smoothing capacitor 3 connected between DC bus lines 3a and 3b of the converter circuit 300.

The single-phase inverter in the inverter circuit 100 is an inverter with a full-bridge configuration, composed of: a plurality of semiconductor switching devices 101a to 104a such as IGBTs (Insulated Gate Bipolar Transistors), to which diodes 101b to 104b are respectively connected in antiparallel; and a DC voltage source 105 composed of a DC capacitor or the like.

The converter circuit 300 has a plurality of semiconductor switching devices 301a to 304a between the DC bus lines. In this case, the converter circuit 300 is composed of two bridge circuits connected in parallel between the DC bus lines, each of which includes two of a plurality of semiconductor switching devices 301a to 304a such as IGBTs connected in series, to which diodes 301b to 304b are respectively connected in antiparallel.

The connection point between the emitter of the semiconductor switching device 301a and the collector of the semiconductor switching device 302a of the converter circuit 300 is connected to an AC output line at the subsequent stage of the inverter circuit 100. The connection point between the emitter of the semiconductor switching device 303a and the collector of the semiconductor switching device 304a is connected to the second terminal of the AC power supply 1.

It is noted that, instead of IGBTs, the semiconductor switching devices 101a to 104a and 301a to 304a may be MOSFETs (Metal Oxide Semiconductor Field Effect Transistors) having diodes between the sources and the drains, for example.

The reactor 2 may be connected in series between the inverter circuit 100 and the converter circuit 300. In the converter circuit 300, mechanical switches may be used instead of the semiconductor switching devices 301a to 304a.

Based on a voltage Vsub of the DC voltage source 105 of the inverter circuit 100, the voltage Vdc of the smoothing capacitor 3, and a voltage Vin and a current Iin from the AC power supply 1, the control circuit 10 generates a gate signal 11 to the semiconductor switching devices 101a to 104a of the inverter circuit 100, and a gate signal 12 to the semiconductor switching devices 301a to 304a of the converter circuit 300, such that a voltage Vdc of the smoothing capacitor 3 becomes a constant target voltage Vdc*, thereby performing output control for the inverter circuit 100 and the converter circuit 300.

A load not shown is connected to the smoothing capacitor 3. In a normal state, the voltage Vdc is lower than the target voltage Vdc*, and the control circuit 10 performs output control for the inverter circuit 100 and the converter circuit 300 so as to convert AC power from the AC power supply 1 and supply DC power to the smoothing capacitor 3.

Figure 6:
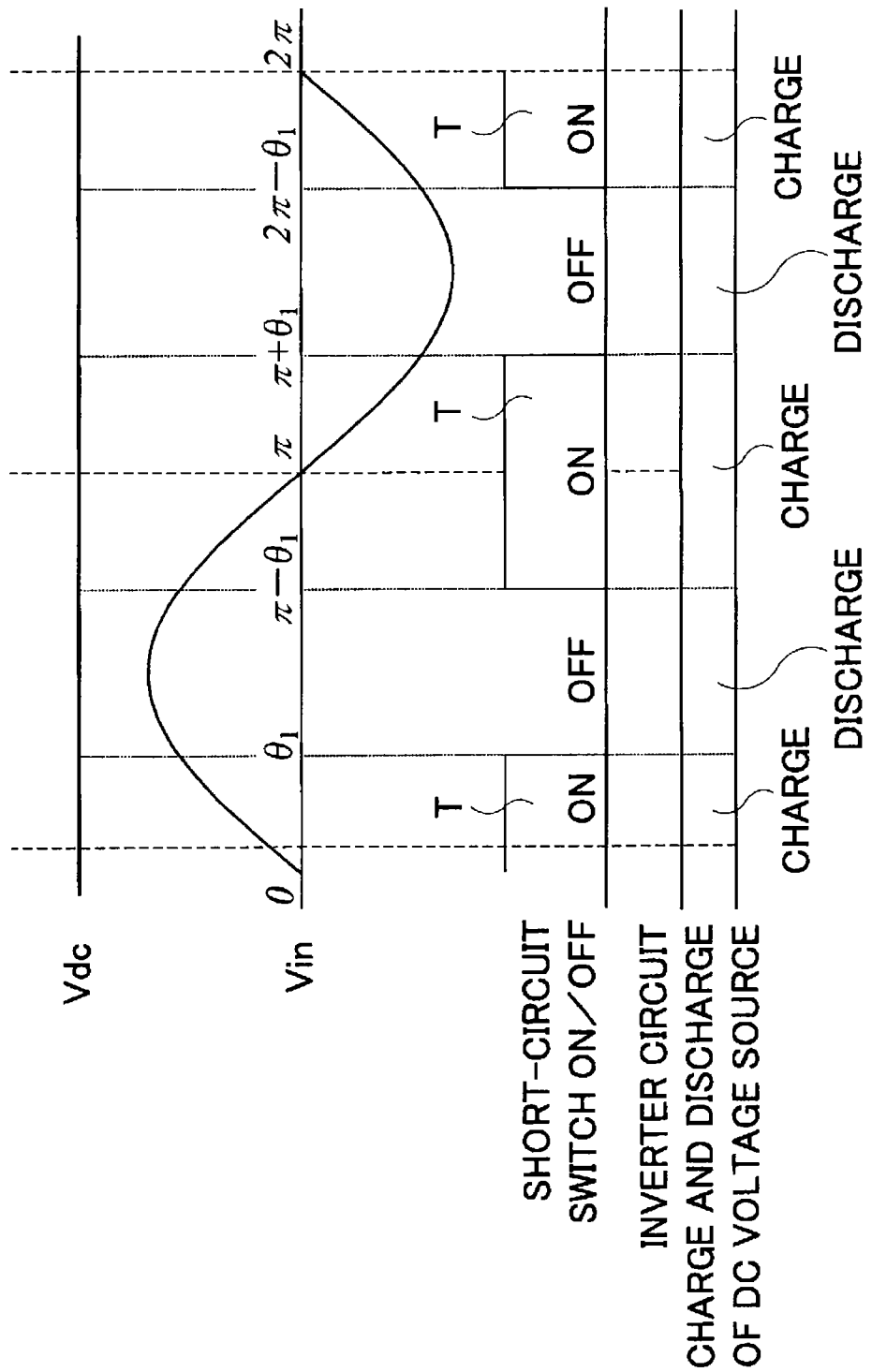
FIG. 6 is a diagram showing the waveform of each section, and charge and discharge of a DC voltage source of an inverter circuit, for illustrating operation in step-up operation of the power conversion apparatus according to embodiment 1 of the present invention.
Figure 7:
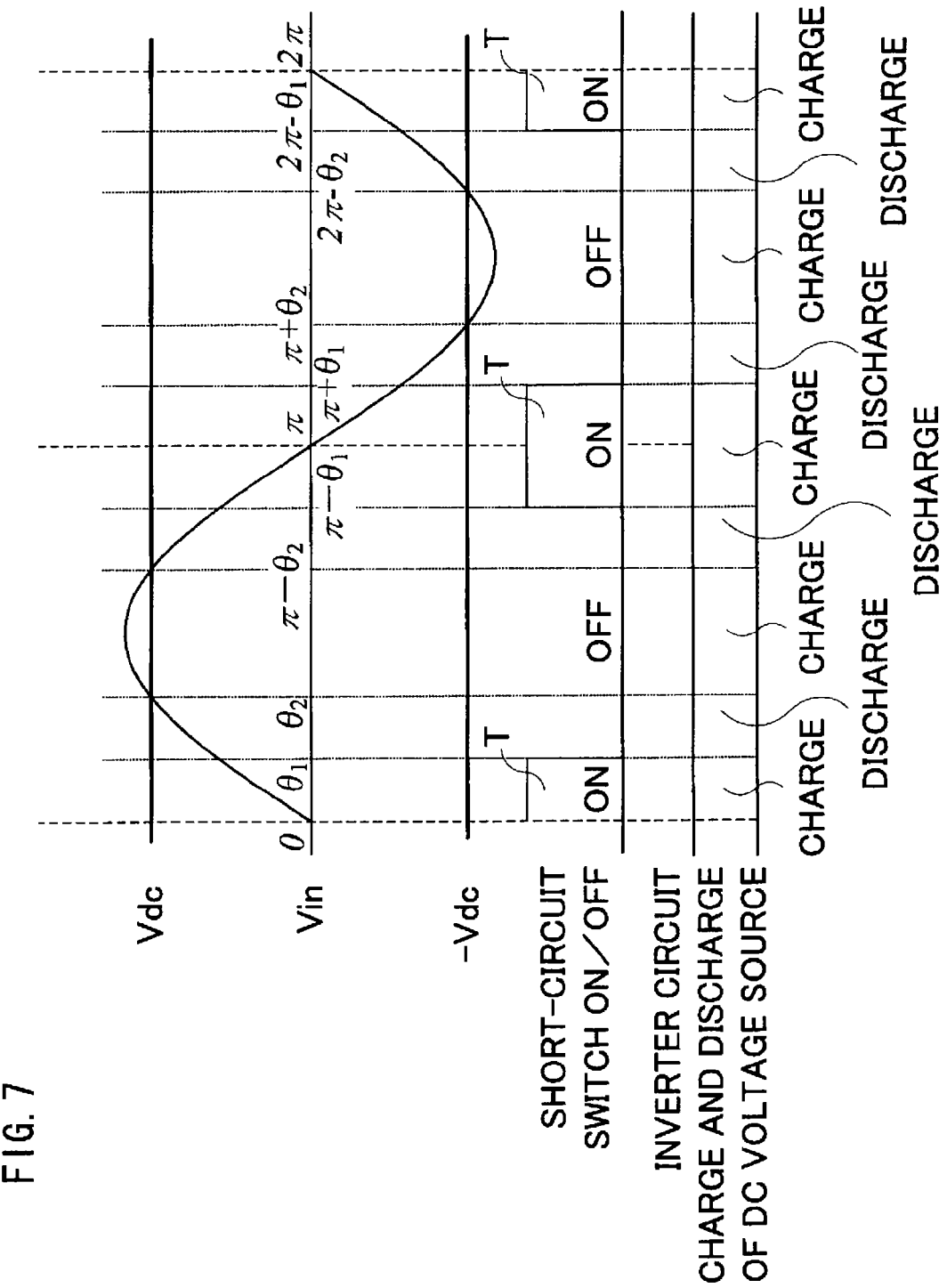
FIG. 7 is a diagram showing the waveform of each section, and charge and discharge of the DC voltage source of the inverter circuit, for illustrating operation in step-down operation of the power conversion apparatus according to embodiment 1 of the present invention.

Power running operation of the power conversion apparatus having the above configuration, that is, operation of outputting DC power to the smoothing capacitor 3 will be described with reference to the drawings. FIGS. 2 to 5 show current route diagrams in the power running operation. FIG. 6 is a diagram showing the waveform of each section, and charge and discharge of the DC voltage source 105 of the inverter circuit 100, for illustrating the power running operation in step-up operation of the power conversion apparatus. FIG. 7 is a diagram showing the waveform of each section, and charge and discharge of the DC voltage source 105 of the inverter circuit 100, for illustrating the power running operation in step-down operation of the power conversion apparatus. It is noted that the operation in which the voltage Vdc of the smoothing capacitor 3 at the output stage is higher than a peak voltage Vp of the voltage Vin of the AC power supply 1 is referred to as "step-up operation", and the operation in which the voltage Vdc of the smoothing capacitor 3 at the output stage is lower than the peak voltage Vp of the voltage Vin of the AC power supply 1 is referred to as "step-down operation". In addition, FIGS. 6 and 7 show the states in which the voltage Vdc of the smoothing capacitor 3 is controlled to be the constant target voltage Vdc*.

The voltage Vin from the AC power supply 1 has waveforms as shown in FIGS. 6 and 7. The inverter circuit 100 controls and outputs the current Iin by PWM control such that the input power factor from the AC power supply 1 is about 1, and superimposes a generated voltage at the AC side onto the voltage Vin which is an output of the AC power supply 1.

First, the case where the voltage Vin is positive, that is, a voltage phase θ of the AC power supply 1 is in a range of $0 \leq \theta < \pi$, will be described.

In the inverter circuit 100, when the semiconductor switching devices 101a and 104a are ON and the semiconductor switching devices 102a and 103a are OFF, a current flows so as to charge the DC voltage source 105, and when the semiconductor switching devices 102a and 103a are ON and the semiconductor switching devices 101a and 104a are OFF, a current flows so as to cause the DC voltage source 105 to discharge. On the other hand, when the semiconductor switching devices 101a and 103a are ON and the semiconductor switching devices 102a and 104a are OFF, and when the semiconductor switching devices 102a and 104a are ON and the semiconductor switching devices 101a and 103a are OFF, a current flows without flowing in the DC voltage source 105. The control circuit 10 controls the semiconductor switching devices 101a to 104a by a combination of the four types of control as described above, to cause the inverter circuit 100 to perform PWM operation, thereby causing the DC voltage source 105 to perform charge and discharge and thus performing the current control. It is noted that when the current flowing in each of the semiconductor switching devices 101a to 104a flows from the emitter to the collector thereof, the semiconductor switching device may be turned off so as to cause the current to flow in the corresponding one of the diodes 101b to 104b connected in antiparallel to said semiconductor switching device.

Figure 2:
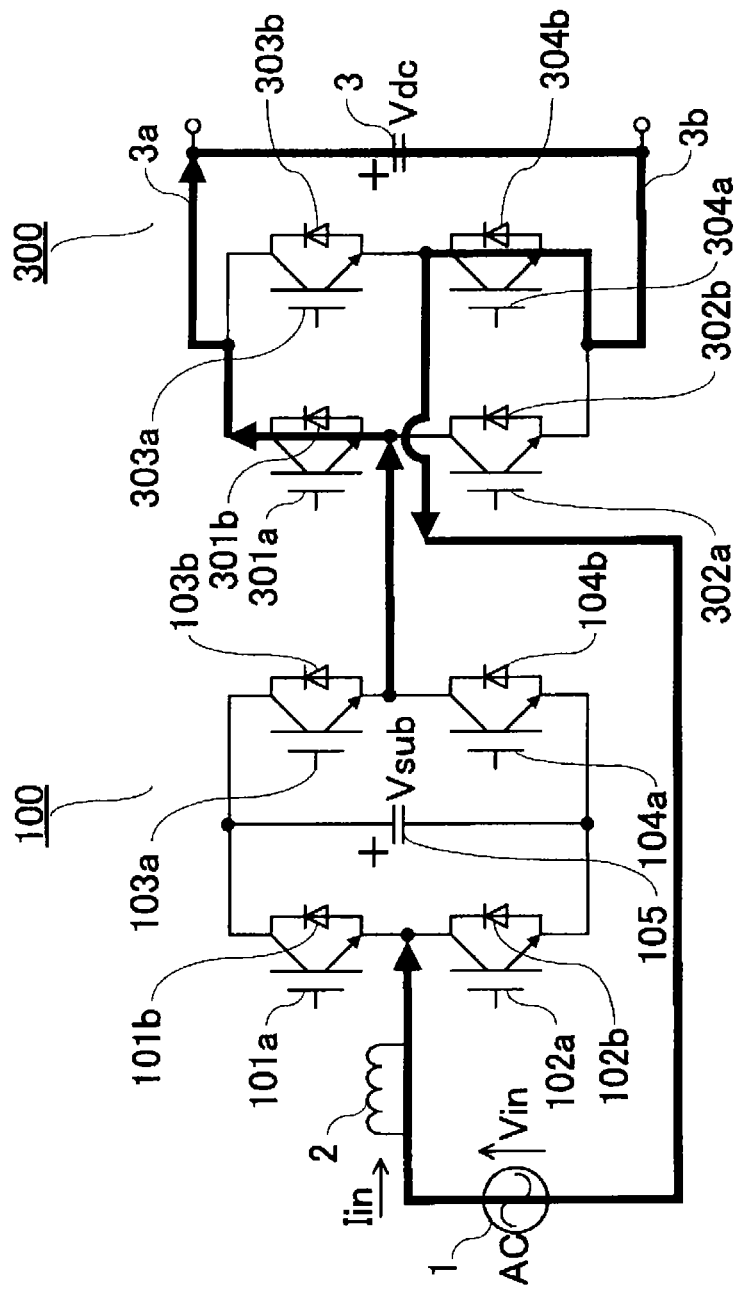
FIG. 2 is a current route diagram for illustrating a power running operation of the power conversion apparatus according to embodiment 1 of the present invention.

As shown in FIG. 2, a current from the AC power supply 1 is limited by the reactor 2, and then inputted to the inverter circuit 100. The output thereof passes through the diode 301b in the converter circuit 300, to charge the smoothing capacitor 3, and then passes through the diode 304b to return to the AC power supply 1. At this time, the control circuit 10 causes the inverter circuit 100 to perform PWM operation, by a combination of the above four types of control, thereby causing the DC voltage source 105 to perform discharge, or charge and discharge, and thus performing the current control.

Figure 3:
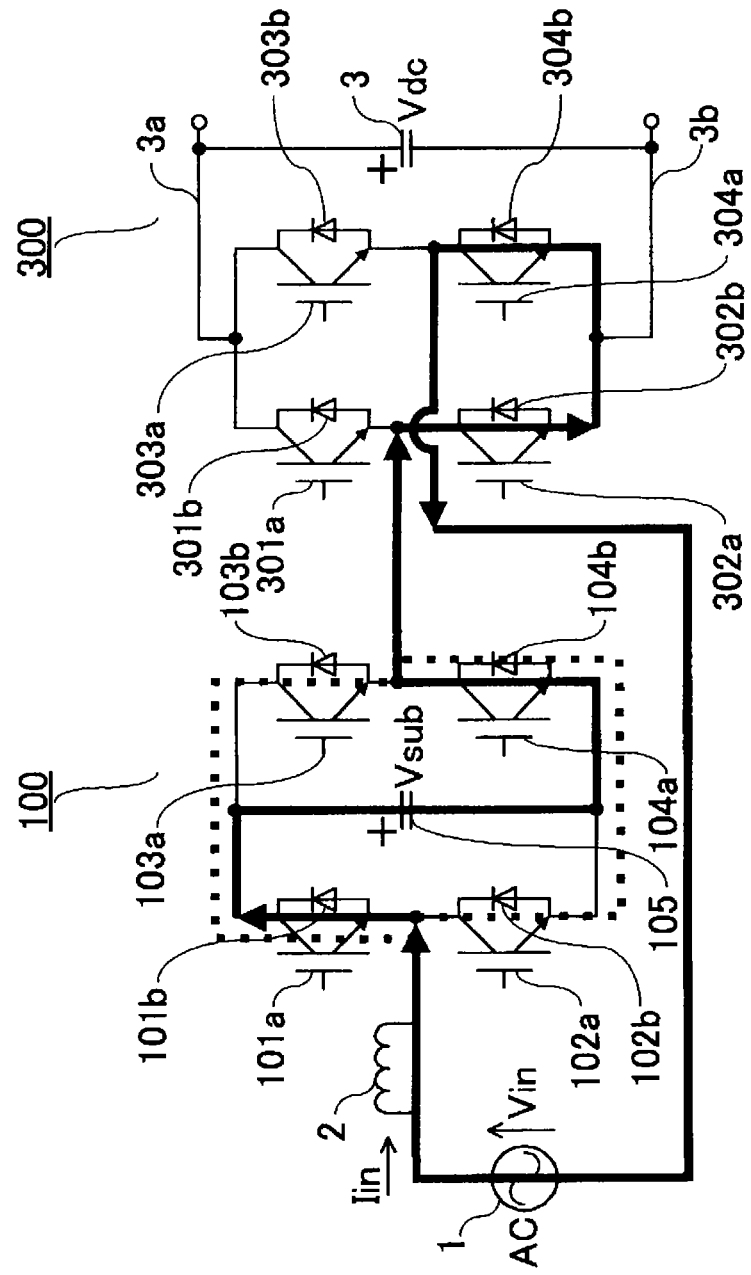
FIG. 3 is a current route diagram for illustrating the power running operation of the power conversion apparatus according to embodiment 1 of the present invention.

In a phase range (hereinafter, referred to as a short-circuit period T) between $\pm\theta_1$ centered at a zero cross phase of the voltage Vin of the AC power supply 1, as shown in FIG. 3, the control circuit 10 turns on the semiconductor switching device 302a which is a short-circuit switch in control for the converter circuit 300, thereby bypassing the smoothing capacitor 3. At this time, the other semiconductor switching devices 301a, 303a, and 304a in the converter circuit 300 are turned off. A current from the AC power supply 1 is limited by the reactor 2 and then inputted to the inverter circuit 100, to charge the DC voltage source 105, and then passes through the semiconductor switching device 302a and the diode 304b in the converter circuit 300, to return to the AC power supply 1. At this time, the control circuit 10 causes the inverter circuit 100 to perform PWM operation, by a combination of control for charging the DC voltage source 105 and control for causing a current not to flow therein, thereby charging the DC voltage source 105 and thus performing the current control.

Next, the case where the voltage Vin is negative, that is, the phase $\theta$ is in a range of $\pi \leq \theta < 2\pi$, will be described.

In the inverter circuit 100, when the semiconductor switching devices 102a and 103a are ON and the semiconductor switching devices 101a and 104a are OFF, a current flows so as to charge the DC voltage source 105, and when the semiconductor switching devices 101a and 104a are ON and the semiconductor switching devices 102a and 103a are OFF, a current flows so as to cause the DC voltage source 105 to discharge. On the other hand, when the semiconductor switching devices 101a and 103a are ON and the semiconductor switching devices 102a and 104a are OFF, and when the semiconductor switching devices 102a and 104a are ON and the semiconductor switching devices 101a and 103a are OFF, a current flows without flowing in the DC voltage source 105. The control circuit 10 controls the semiconductor switching devices 101a to 104a by a combination of the four types of control as described above, to cause the inverter circuit 100 to perform PWM operation, thereby causing the DC voltage source 105 to perform charge and discharge and thus performing the current control.

Figure 4:
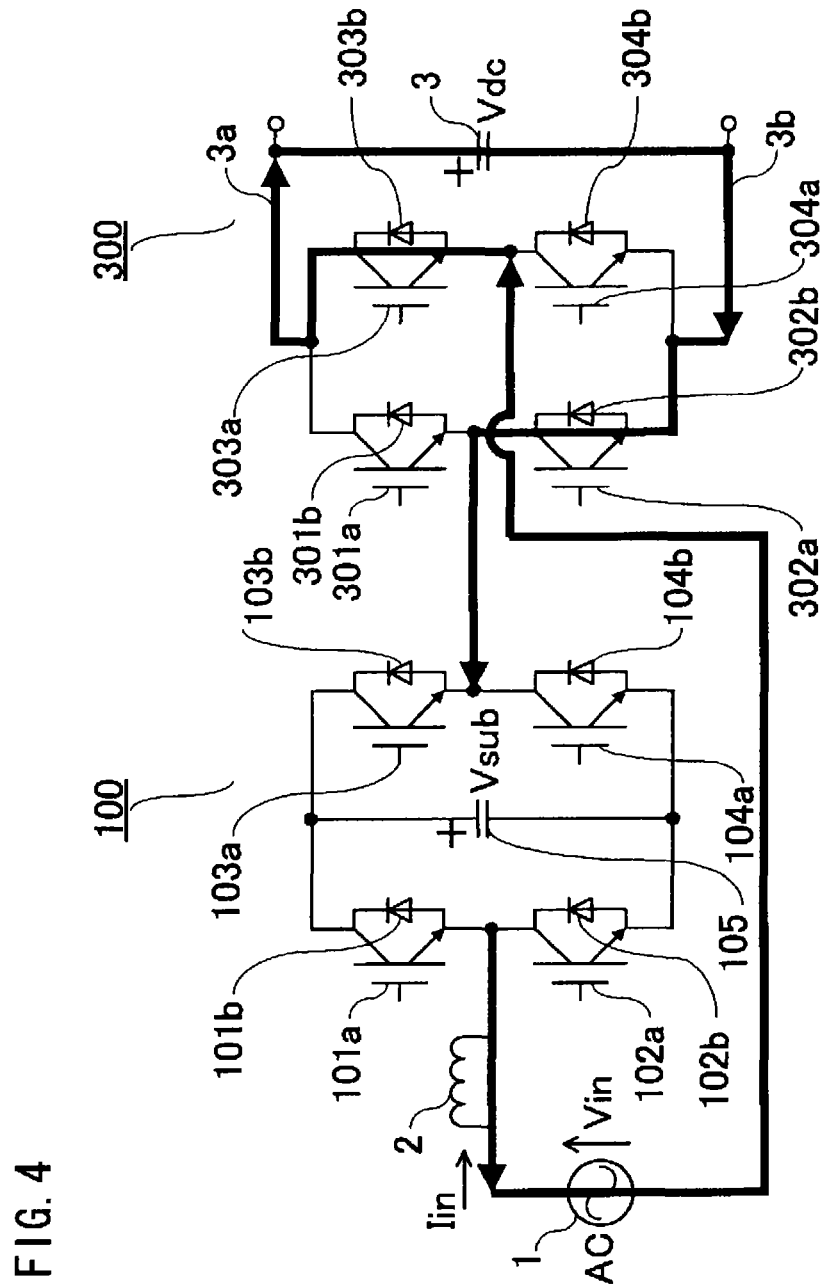
FIG. 4 is a current route diagram for illustrating the power running operation of the power conversion apparatus according to embodiment 1 of the present invention.

As shown in FIG. 4, a current from the AC power supply 1 passes through the diode 303b in the converter circuit 300, to charge the smoothing capacitor 3, and then passes through the diode 302b to be inputted to the inverter circuit 100. The output of the inverter circuit 100 passes through the reactor 2 to return to the AC power supply 1. At this time, the control circuit 10 causes the inverter circuit 100 to perform PWM operation, by a combination of the above four types of control, thereby causing the DC voltage source 105 to perform discharge, or charge and discharge, and thus performing the current control.

Figure 5:
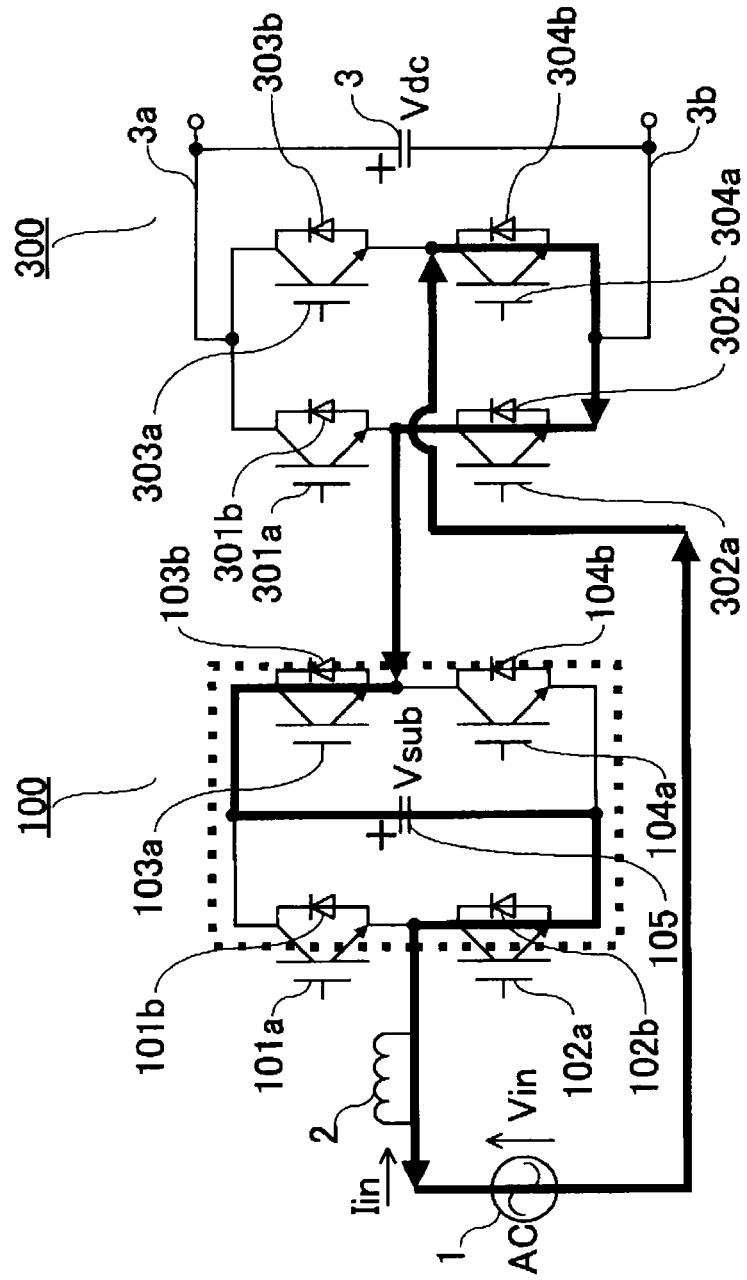
FIG. 5 is a current route diagram for illustrating the power running operation of the power conversion apparatus according to embodiment 1 of the present invention.

In the short-circuit period T, as shown in FIG. 5, the control circuit 10 turns on the semiconductor switching device 304a which is a short-circuit switch in control for the converter circuit 300, thereby bypassing the smoothing capacitor 3. At this time, the other semiconductor switching devices 301a, 302a, and 303a in the converter circuit 300 are turned off. A current from the AC power supply 1 passes through the semiconductor switching device 304a and the diode 302b in the converter circuit 300, to be inputted to the inverter circuit 100, charges the DC voltage source 105, and then passes through the reactor 2 to return to the AC power supply 1. At this time, the control circuit 10 causes the inverter circuit 100 to perform PWM operation, by a combination of control for charging the DC voltage source 105 and control for causing a current not to flow therein, thereby charging the DC voltage source 105 and thus performing the current control.

In the control for the converter circuit 300, the case where the control circuit 10 turns on each of the semiconductor switching devices 302a and 304a only when the semiconductor switching device is operated as a short-circuit switch, has been described. However, when a current flows in each of the diodes 301b to 304b, the corresponding one of the semiconductor switching devices 301a to 304a to which the diode is connected in antiparallel may be turned on so that the current flows in the corresponding one of the semiconductor switching devices 301a to 304a. That is, whether the voltage Vin is positive or negative, in the short-circuit period T, the two semiconductor switching devices 302a and 304a may be turned on as short-circuit switches, or the other two semiconductor switching devices 301a and 303a may be turned on as short-circuit switches.

By the above operation, in the step-up operation of the power conversion apparatus, as shown in FIG. 6, the inverter circuit 100 outputs the voltage (−Vin) to charge the DC voltage source 105 by the AC power supply 1 in the short-circuit period T. Thereafter, in a period of $\theta_1 \leq \theta < \pi - \theta_1$ for causing the DC voltage source 105 to discharge, the inverter circuit 100 adds (Vdc*−Vin) which is an output voltage of the inverter circuit 100, to the voltage Vin of the AC power supply 1, whereby the voltage Vdc of the smoothing capacitor 3 is controlled to be the target voltage Vdc* that is higher than a peak voltage of the AC power supply 1.

In addition, in the step-down operation of the power conversion apparatus, as shown in FIG. 7, the inverter circuit 100 outputs the voltage (−Vin) to charge the DC voltage source 105 by the AC power supply 1 in the short-circuit period T. Thereafter, the inverter circuit 100 adds an output voltage of the inverter circuit 100 to the voltage Vin of the AC power supply 1, whereby the voltage Vdc of the smoothing capacitor 3 is controlled to be the target voltage Vdc* that is lower than the peak voltage of the AC power supply 1. Here, $\theta_2$ ($0<\theta_2<\pi/2$) is defined as the phase $\theta$ where the voltage Vin of the AC power supply 1 is equal to the target voltage Vdc* of the smoothing capacitor 3. Then, when the phase $\theta$ is in a range of $\theta_1 \leq \theta < \theta_2$, and when the phase $\theta$ is in a range of $\pi - \theta_2 \leq \theta < \pi - \theta_1$, the inverter circuit 100 outputs a voltage (Vdc*−Vin) to cause the DC voltage source 105 to discharge. When the phase $\theta$ is in a range of $\theta_2 \leq \theta < \pi - \theta_2$, the inverter circuit 100 outputs a voltage (Vin−Vdc*) to charge the DC voltage source 105.

As described above, in the power running operation, when the voltage phase $\theta$ of the AC power supply 1 is (the zero cross phase ($\theta=0, \pi$)$\pm\theta_1$), the control circuit 10 switches the control for the converter circuit 300, and only in the short-circuit period T which is a phase range between $\pm\theta_1$ centered at the zero cross phase, the control circuit 10 turns on the semiconductor switching devices 302a and 304a which are short-circuit switches, to bypass the smoothing capacitor 3. At this time, the control circuit 10 performs the output control for the inverter circuit 100 so as to generate, in the inverter circuit 100, a voltage substantially equal to the opposite polarity voltage of the voltage Vin and to control the current Iin such that the input power factor is about 1, while the DC voltage source 105 is charged. On the other hand, in the phase range other than the short-circuit period, the control circuit 10 performs the output control for the inverter circuit 100 so as to maintain the DC voltage Vdc of the smoothing capacitor 3 at the target voltage Vdc* and to control the current Iin such that the input power factor is about 1. At this time, when the absolute value of the voltage Vin is equal to or lower than the target voltage Vdc* of the smoothing capacitor 3, the DC voltage source 105 discharges, and when the absolute value of the voltage Vin is equal to or higher than the target voltage Vdc*, the DC voltage source 105 is charged.

It is noted that although the short-circuit period T is centered at the zero cross phase ($\theta=0, \pi$), the short-circuit period T may be a range, including the zero cross phase, whose center is deviated in either direction.

In addition, the phase range of the short-circuit period T can be decided so as to make energy of charge and energy of discharge of the DC voltage source 105 of the inverter circuit 100 equal to each other. If energy of charge and energy of discharge of the DC voltage source 105 of the inverter circuit 100 are equal to each other, in the step-down operation in which Vdc*<Vp is satisfied, the following expression is obtained. Here, Vp is a peak voltage of the voltage Vin, and Ip is a peak current of the current Iin.

$$\int_0^{\theta_1} V_p \sin\theta \cdot I_p \sin\theta \cdot d\theta + \int_{\theta_2}^{\pi/2}(V_p\sin\theta - V_{dc}^*) \cdot I_p \sin\theta \cdot d\theta = \int_{\theta_1}^{\theta_2}(V_{dc}^* - V_p\sin\theta)\cdot I_p\sin\theta\cdot d\theta$$ [Expression 1]

Here, if Vin=Vp·sin θ and Iin=Ip·sin θ are assumed, Vdc*=Vp·π/(4 cos $\theta_1$) is obtained.

Vdc* takes its lower limit value when $\theta_1$ is 0, the lower limit value being (π/4)Vp.

Thus, the target voltage Vdc* of the smoothing capacitor 3 is decided by $\theta_1$ which decides the phase range of the short-circuit period T. That is, the target voltage Vdc* can be controlled by $\theta_1$ being changed. Then, the DC voltage Vdc of the smoothing capacitor 3 is controlled so as to follow the target voltage Vdc*.

Next, a voltage condition for the DC voltage source 105 of the inverter circuit 100 will be described.

The voltage Vsub of the DC voltage source 105 is set to be equal to or higher than a desired generated voltage of the inverter circuit 100 in each range of $0 \leq \theta < \theta_1$ and $\theta_1 \leq \theta < \pi/2$ in the step-up operation, and in each range of $0 \leq \theta < \theta_1$, $\theta_1 \leq \theta < \theta_2$, and $\theta_2 \leq \theta < \pi/2$ in the step-down operation, whereby the inverter circuit 100 can perform the above desired control with high reliability. That is, the following three conditions need to be satisfied.

A: Vsub≥Vp·sin $\theta_1$
B: Vsub≥(Vdc*−Vp·sin $\theta_1$)
C: Vsub≥(Vp−Vdc*)

Here, Vp is a peak voltage of the voltage Vin, and the voltage Vsub is set to be equal to or lower than the peak voltage Vp.

Figure 8:
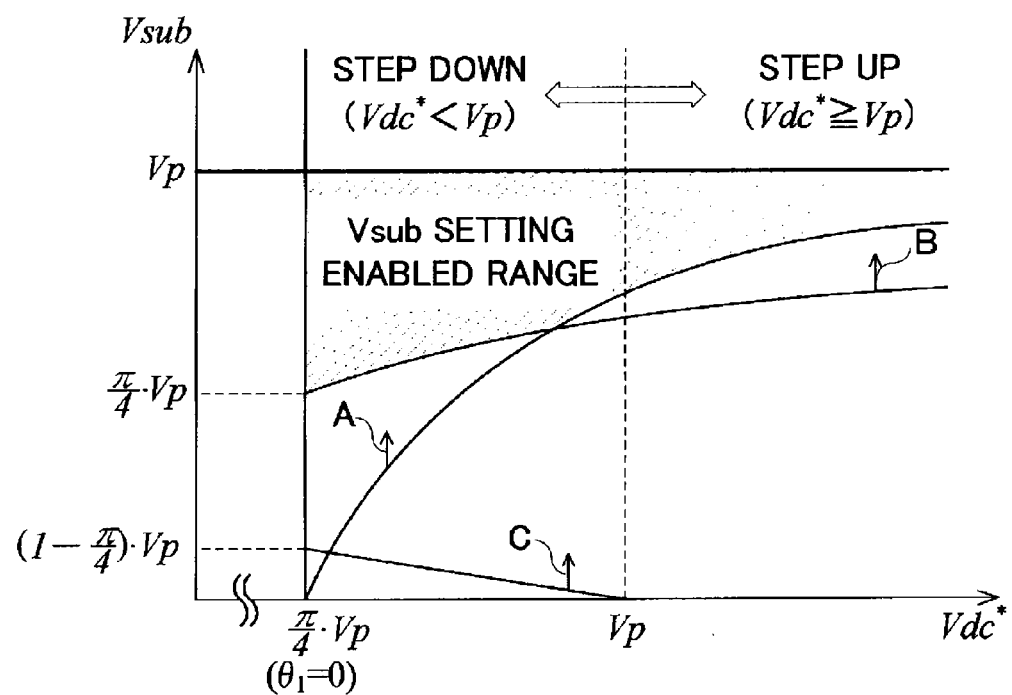
FIG. 8 is a diagram showing a voltage range of the DC voltage source of the inverter circuit according to embodiment 1 of the present invention.

Accordingly, a setting enabled range of the voltage Vsub of the DC voltage source 105 of the inverter circuit 100 is as shown in FIG. 8. By thus setting the voltage Vsub of the DC voltage source 105, it becomes possible to maintain the DC voltage Vdc of the smoothing capacitor 3 at the target voltage Vdc*, and to perform the control for the inverter circuit 100 for controlling the current Iin such that the input power factor is about 1, with high reliability over the entire range of phases of the AC power supply 1.

In the inverter circuit 100 subjected to PWM control, the loss increases as the voltage Vsub of the DC voltage source 105 increases. Therefore, it is desirable that the voltage Vsub is set to be small under the voltage condition satisfying the above setting enabled range.

Further, by setting only the phase range between ±$\theta_1$ centered at the zero cross phase as the short-circuit period T for bypassing the smoothing capacitor 3, whether in the short-circuit period T or the other periods, it becomes possible to, by operation of the inverter circuit 100, control the current Iin such that the input power factor is about 1, and output DC power with a desired voltage to the smoothing capacitor 3.

Figure 9:
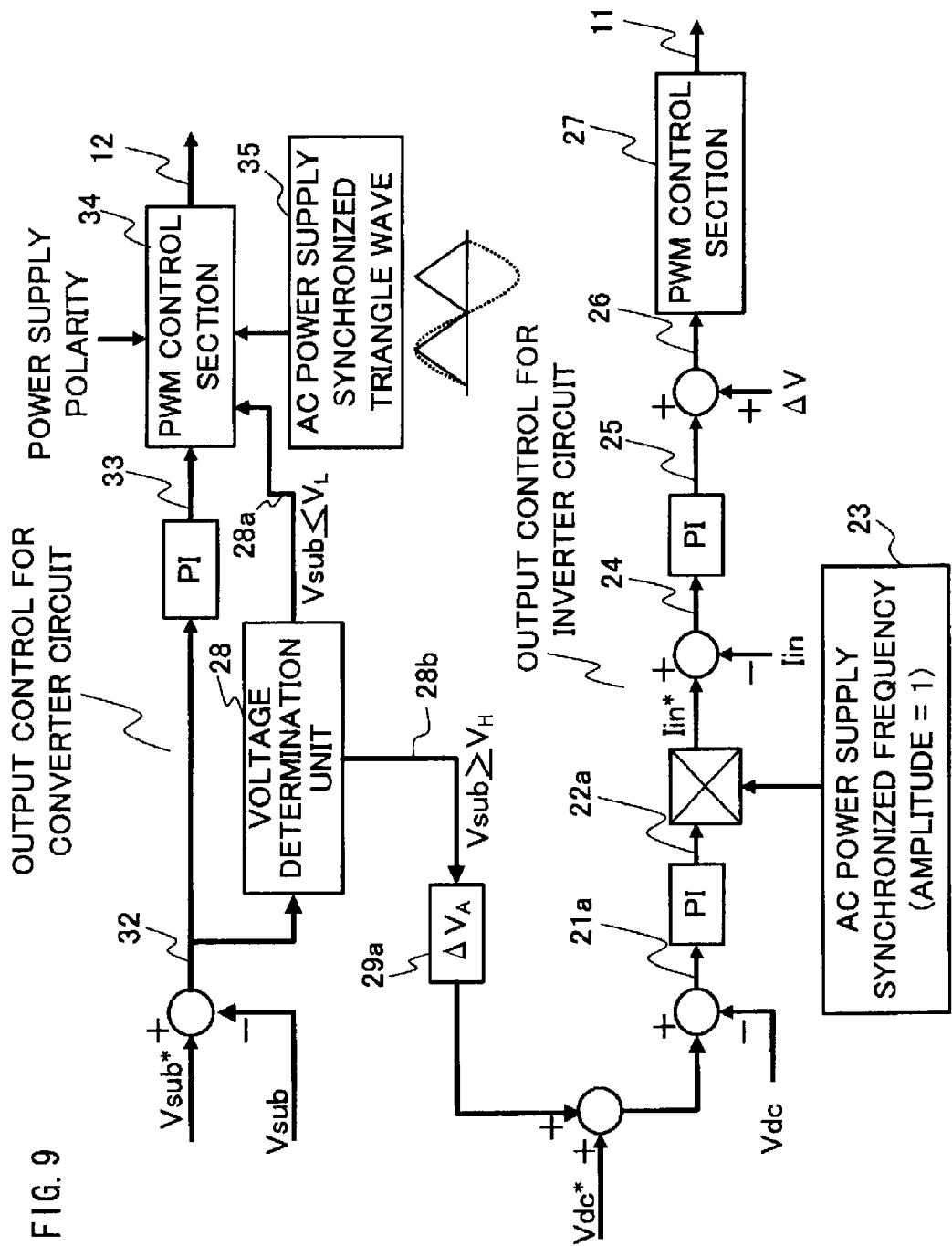
FIG. 9 is a control block diagram showing control by the power conversion apparatus according to embodiment 1 of the present invention.

Next, control for the inverter circuit 100 and the converter circuit 300 will be described below in detail with reference to FIG. 9. FIG. 9 is a control block diagram by the control circuit 10, and shows output control for the converter circuit 300 and output control for the inverter circuit 100.

As shown in FIG. 9, in output control for the converter circuit 300, the control circuit 10 causes the voltage Vsub of the DC voltage source 105 of the inverter circuit 100 to follow an instruction value Vsub*.

The control circuit 10 obtains, as a voltage instruction, an output 33 by PI control using as a feedback amount a difference 32 between the set instruction value Vsub* and the detected voltage Vsub, and then, based on the voltage instruction, generates a gate signal 12 for each of the semiconductor switching devices 301a to 304a of the converter circuit 300, by a PWM control section 34. The PWM control section 34 performs comparison operation using, as a carrier wave, a triangle wave (AC power supply synchronized triangle wave) 35 which is synchronized with a period two times as high as the frequency of the AC power supply 1, and generates the gate signal 12 which causes a signal obtained by the comparison operation to operate being substantially centered at the zero cross phase of the voltage Vin of the AC power supply 1 depending on the polarity of the AC power supply 1. That is, by the gate signal 12, also the short-circuit period T for short-circuiting the AC terminals of the converter circuit 300 is controlled, so that the short-circuit period T increases as the voltage Vsub decreases, and the short-circuit period T decreases as the voltage Vsub increases.

At a phase of (the zero cross phase−$\theta_1$) of the voltage Vin of the AC power supply 1, when the control circuit 10 turns the short-circuit switch of the converter circuit 300 from off to on by the gate signal 12, in order to control the current, it is necessary to satisfy a voltage condition of Vp·|sin $\theta_1$|<Vsub. In view of the current control, when the voltage Vsub of the DC voltage source 105 of the inverter circuit 100 has decreased to be out of the above voltage condition, the PWM control section 34 restricts the short-circuit switch from being turned on. Then, when the phase of the voltage Vin approaches the zero cross phase and |Vin|<Vsub has been satisfied, the short-circuit switch is turned from off to on.

In addition, the difference 32 between the instruction value Vsub* and the detected voltage Vsub is inputted also to a voltage determination unit 28. When the difference 32 has become out of a set range, the voltage determination unit 28 outputs control signals 28a and 28b. The control signal 28a is a signal for changing the control for the converter circuit 300. When the voltage Vsub has become out of the above voltage condition for the current control and then further decreased to be equal to or lower than a predetermined lower limit value $V_L$, the control signal 28a is outputted to the PWM control section 34. The PWM control section 34 releases the restriction of ON-operation of the short-circuit switch and turns on the short-circuit switch to short-circuit the AC terminals of the converter circuit 300, whereby the DC voltage source 105 is charged until the voltage Vsub of the DC voltage source 105 of the inverter circuit 100 becomes a required voltage.

It is noted that the control signal 28b is a signal for changing the control for the inverter circuit 100. When the voltage Vsub has increased to be equal to or higher than a predetermined upper limit value $V_H$, the control signal 28b is outputted, based on the difference 32, from the voltage determination unit 28. Then, the output control for the inverter circuit 100 will be described below.

As shown in FIG. 9, in the output control for the inverter circuit 100, the control circuit 10 maintains the DC voltage Vdc of the smoothing capacitor 3 at the target voltage Vdc*, and controls the current Iin such that the power factor of the AC power supply 1 is about 1. First, in control for stationary state, the control circuit 10 obtains, as an amplitude target value 22a, an output by PI control using as a feedback amount a difference 21a between the DC voltage Vdc and the target voltage Vdc* of the smoothing capacitor 3, and then, based on the amplitude target value 22a, generates a current instruction Iin* which is a sine wave synchronized with the voltage Vin, from an AC power supply synchronized frequency 23 having an amplitude of 1. Next, the control circuit 10 obtains an output by PI control using as an feedback amount a difference 24 between the current instruction Iin* and the detected current Iin, and the obtained output is used as a voltage instruction 25 which is a target value of the generated voltage of the inverter circuit 100. At this time, the control circuit 10 corrects the voltage instruction 25 by adding thereto a feedforward correction voltage ΔV synchronized with a time of switching between control in the short-circuit period T for short-circuiting the AC terminals of the converter circuit 300, and control for making each AC terminal of the converter circuit 300 conductive with the smoothing capacitor 3, that is, control in the periods other than the short-circuit period. Then, based on the corrected voltage instruction 26, the control circuit 10 generates, by a PWM control section 27, the gate signal 11 for each of the semiconductor switching devices 101a to 104a of the inverter circuit 100, thereby operating the inverter circuit 100.

In addition, when the voltage Vsub has increased to be equal to or higher than the predetermined upper limit value $V_H$, the control signal 28b is outputted from the voltage determination unit 28 to an addition voltage operation unit 29a, based on the difference 32 between the instruction value Vsub* and the detected voltage Vsub, whereby the control is changed from that for the stationary state described above. That is, the addition voltage operation unit 29a outputs a positive voltage $\Delta V_A$ in accordance with the difference 32 between the instruction value Vsub* and the voltage Vsub, and adds the positive voltage $\Delta V_A$ to the target voltage Vdc* of the smoothing capacitor 3. Thus, the target voltage Vdc* of the smoothing capacitor 3 is increased to increase the current instruction Iin*, whereby the discharge amount of the DC voltage source 105 of the inverter circuit 100 is increased. Thus, the control circuit 10 performs control to increase the discharge amount of the DC voltage source 105 at the time of discharge in comparison with the stationary state, until the voltage Vsub of the DC voltage source 105 of the inverter circuit 100 becomes a required voltage.

In the present embodiment, the control circuit 10 controls the inverter circuit 100 based on the current instruction Iin*, thereby realizing control that causes the voltage Vdc of the smoothing capacitor 3 to follow the target voltage Vdc* and improves the power factor of the AC power supply 1. In the converter circuit 300, since it is not necessary to perform high-frequency switching, switching loss hardly occurs. In addition, the inverter circuit 100 which operates so as to control the power factor and control the DC voltage Vdc of the smoothing capacitor 3 can make the voltage Vsub used in the switching much lower than the peak voltage of the AC power supply 1. Therefore, it is possible to reduce switching loss and noise without a large reactor 2, thereby improving the reliability of devices in the inverter circuit 100.

In addition, the control circuit 10 controls the converter circuit 300 by providing the short-circuit period T for bypassing the smoothing capacitor 3, so that in the inverter circuit 100, the DC voltage source 105 is charged in the short-circuit period T. Therefore, it is possible to prevent the current from being 0 without the inverter circuit 100 generating a high voltage, and to use energy stored in the DC voltage source 105 for discharge to the smoothing capacitor 3. Therefore, in the inverter circuit 100, the voltage used in the switching can be further reduced, whereby the efficiency can be further increased and noise can be further reduced.

In addition, when the voltage Vsub of the DC voltage source 105 of the inverter circuit 100 has increased to be equal to or higher than the predetermined upper limit value $V_H$, the control circuit 10 changes the control for the inverter circuit 100 from the control for the stationary state, to add the positive voltage $\Delta V_A$ corresponding to the difference 32 between the instruction value Vsub* and the voltage Vsub, to the target voltage Vdc* of the smoothing capacitor 3, thereby increasing the target voltage Vdc* to increase the current instruction Iin*. Thus, it is possible to increase the discharge amount of the DC voltage source 105 of the inverter circuit 100 to promptly recover the voltage Vsub of the DC voltage source 105. Therefore, the control circuit 10 can promptly recover the current control for the stationary state in the inverter circuit 100, that is, the voltage control for outputting the original target voltage Vdc* to the smoothing capacitor 3, thereby stably continuing the voltage control for outputting a desired voltage to the smoothing capacitor 3.

In addition, when the voltage Vsub of the DC voltage source 105 of the inverter circuit 100 has decreased to be out of the predetermined voltage condition for the current control, the control circuit 10 restricts the short-circuit switch of the converter circuit 300 from being turned on, thereby prioritizing the current control. If the short-circuit switch is restricted from being turned on, the current control is prioritized, but the voltage Vsub of the DC voltage source 105 is not recovered unless the short-circuit switch is turned on, and therefore, there is fear that the power conversion operation for outputting a desired voltage to the smoothing capacitor 3 might be disabled. However, when the voltage Vsub has further decreased to be equal to or lower than the predetermined lower limit value $V_L$, the control circuit 10 releases the restriction of the ON-operation of the short-circuit switch, to charge the DC voltage source 105. As a result, although the current control is temporarily disturbed, it is possible to promptly recover the voltage Vsub of the DC voltage source 105 and to promptly recover the current control for the stationary state in the inverter circuit, thereby stably continuing the voltage control for outputting a desired voltage to the smoothing capacitor.

It is noted that since in the present embodiment, the power conversion apparatus performs only the power running operation, the converter circuit 300 may have only diodes without the semiconductor switching devices 301a and 303a, at the upper arms of the two bridge circuits connected in parallel between the DC bus lines.

Embodiment 2

In the above embodiment 1, when the voltage Vsub of the DC voltage source 105 of the inverter circuit 100 has increased to be equal to or higher than the predetermined upper limit value $V_H$, the control circuit 10 increases the target voltage Vdc* of the smoothing capacitor 3 to increase the current instruction Iin*. On the other hand, in the present embodiment, the current instruction Iin* is increased by another control.

Figure 10:
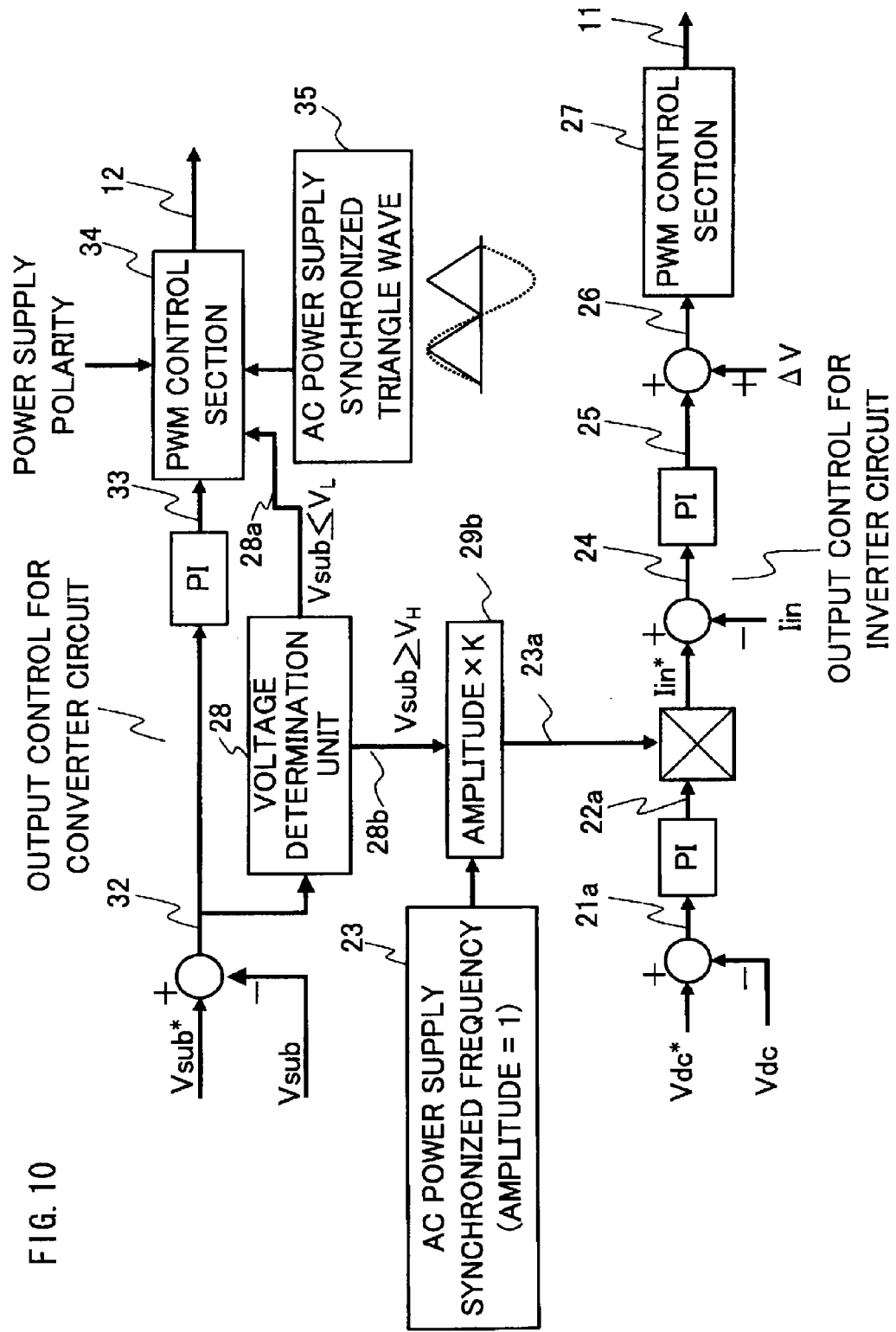
FIG. 10 is a control block diagram showing control by a power conversion apparatus according to embodiment 2 of the present invention.

FIG. 10 is a control block diagram by the control circuit 10 of a power conversion apparatus according to embodiment 2 of the present invention, and shows output control for the converter circuit 300 and output control for the inverter circuit 100. It is noted that the configuration of the main circuit is the same as that of the above embodiment 1, and the output control for the converter circuit 300 is the same as that shown in FIG. 9 of the above embodiment 1.

As shown in FIG. 10, in the output control for the inverter circuit 100, the control circuit 10 maintains the DC voltage Vdc of the smoothing capacitor 3 at the target voltage Vdc*, and controls the current Iin such that the power factor of the AC power supply 1 is about 1. First, in control for the stationary state, the control circuit 10 obtains, as the amplitude target value 22a, an output by PI control using as a feedback amount the difference 21a between the DC voltage Vdc and the target voltage Vdc* of the smoothing capacitor 3, and then, based on the amplitude target value 22a, generates the current instruction Iin* which is a sine wave synchronized with the voltage Vin, from the AC power supply synchronized frequency 23 having an amplitude of 1.

When the voltage Vsub has increased to be equal to or higher than the predetermined upper limit value $V_H$, the control signal 28b is outputted from the voltage determination unit 28 to an amplitude multiplication unit 29b, based on the difference 32 between the instruction value Vsub* and the detected voltage Vsub, whereby the control is changed from that for the stationary state described above. That is, the amplitude multiplication unit 29b multiplies the amplitude (=1) of the AC power supply synchronized frequency 23 by a coefficient K corresponding to the difference 32 between the instruction value Vsub* and the voltage Vsub, thereby generating an AC power supply synchronized frequency 23a having an amplitude of K. Then, the current instruction Iin* which is a sine wave synchronized with the voltage Vin is generated from the amplitude target value 22a and the AC power supply synchronized frequency 23a having the amplitude of K.

The other points of the output control for the inverter circuit 100 are the same as those described in FIG. 9 in the above embodiment 1.

In this case, the control circuit 10 increases the amplitude of the AC power supply synchronized frequency 23 to increase the current instruction Iin* until the voltage Vsub of the DC voltage source 105 of the inverter circuit 100 becomes a required voltage. Therefore, as in the above embodiment 1, it is possible to increase the discharge amount of the DC voltage source 105 to promptly recover the voltage Vsub of the DC voltage source 105, thereby providing the same effect.

Embodiment 3

In the above embodiments 1 and 2, when the voltage Vsub of the DC voltage source 105 of the inverter circuit 100 has increased to be equal to or higher than the predetermined upper limit value $V_H$, the control circuit 10 increases the current instruction Iin* to increase the discharge amount of the DC voltage source 105. On the other hand, in the present embodiment, the discharge amount of the DC voltage source 105 is increased by another control.

Figure 11:
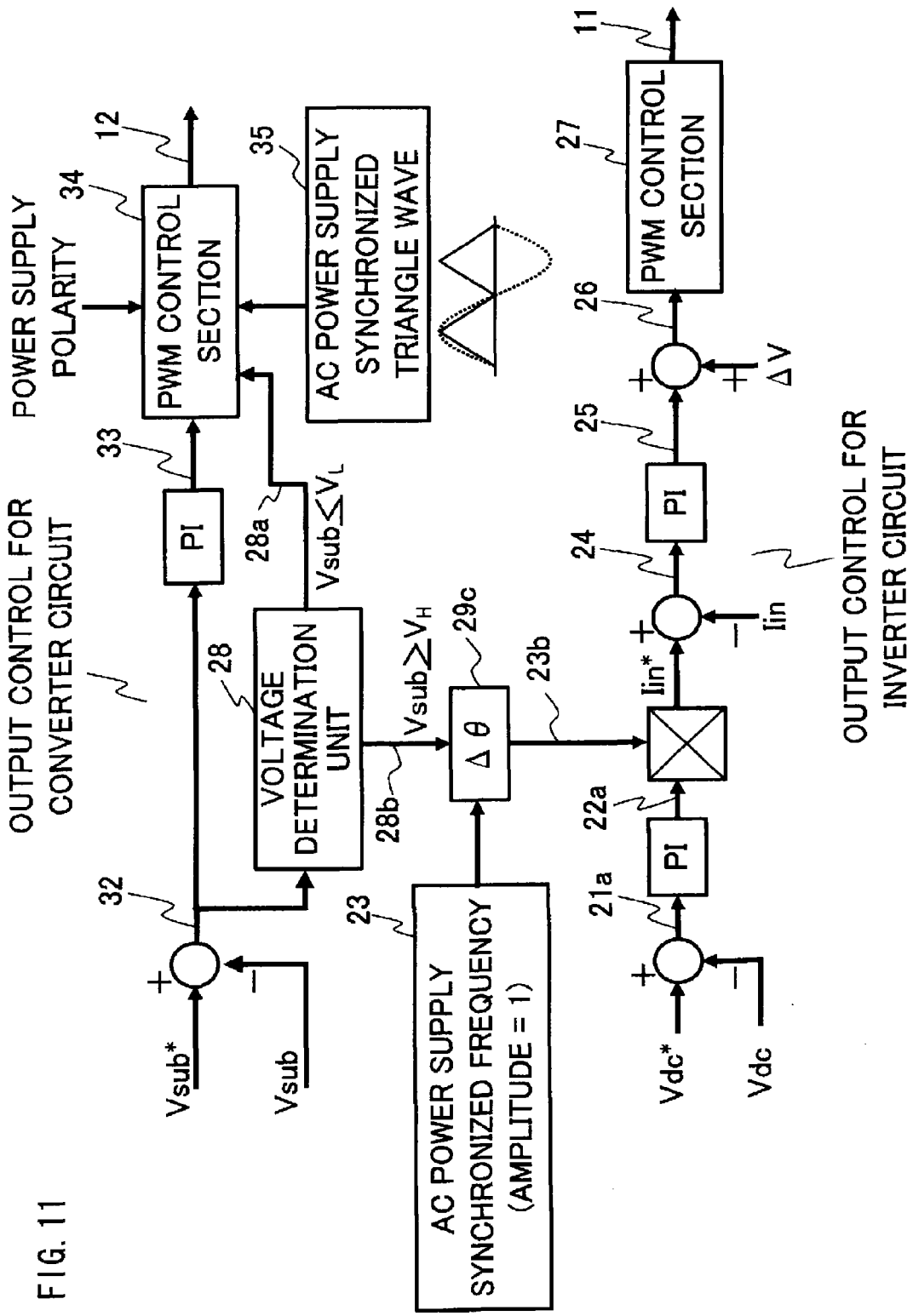
FIG. 11 is a control block diagram showing control by a power conversion apparatus according to embodiment 3 of the present invention.

FIG. 11 is a control block diagram by the control circuit 10 of a power conversion apparatus according to embodiment 3 of the present invention, and shows output control for the converter circuit 300 and output control for the inverter circuit 100. It is noted that also in this case, the configuration of the main circuit is the same as that of the above embodiment 1, and the output control for the converter circuit 300 is the same as that shown in FIG. 9 of the above embodiment 1.

As shown in FIG. 11, in the output control for the inverter circuit 100, the control circuit 10 maintains the DC voltage Vdc of the smoothing capacitor 3 at the target voltage Vdc*, and controls the current Iin such that the power factor of the AC power supply 1 is about 1. First, in control for the stationary state, the control circuit 10 obtains, as the amplitude target value 22a, an output by PI control using as a feedback amount the difference 21a between the DC voltage Vdc and the target voltage Vdc* of the smoothing capacitor 3, and then, based on the amplitude target value 22a, generates the current instruction Iin* which is a sine wave synchronized with the voltage Vin, from the AC power supply synchronized frequency 23 having an amplitude of 1.

When the voltage Vsub has increased to be equal to or higher than the predetermined upper limit value $V_H$, the control signal 28b is outputted from the voltage determination unit 28 to a phase shifting unit 29c, based on the difference 32 between the instruction value Vsub* and the detected voltage Vsub, whereby the control is changed from that for the stationary state described above. That is, the phase shifting unit 29c shifts the phase of the AC power supply synchronized frequency 23 having an amplitude of 1, by a phase angle AO corresponding to the difference 32 between the instruction value Vsub* and the voltage Vsub, thereby generating a frequency 23b. Then, the current instruction Iin* which is a sine wave whose phase is shifted by the predetermined phase angle $\Delta\theta$ from the phase of the voltage Vin is generated from the amplitude target value 22a and the frequency 23b.

The other points of the output control for the inverter circuit 100 are the same as those described in FIG. 9 of the above embodiment 1.

In this case, the control circuit 10 shifts the phase of the current instruction Iin* by the predetermined phase angle $\Delta\theta$ until the voltage Vsub of the DC voltage source 105 of the inverter circuit 100 becomes a required voltage. As a result, a wattless current increases and the inverter circuit 100 is subjected to the output control so as to increase the discharge amount of the DC voltage source 105. Therefore, it is possible to promptly recover the voltage Vsub of the DC voltage source 105, thereby providing the same effect.

It is noted that the control methods for increasing the current instruction Iin* described in the above embodiments 1 and 2 and the control method for shifting the phase of the current instruction Iin* described in the above embodiment 3 may be each performed alone or may be performed in a combined manner, to increase the discharge amount of the DC voltage source 105.

Embodiment 4

In the present embodiment, when the voltage Vsub of the DC voltage source 105 of the inverter circuit 100 has increased to be equal to or higher than the predetermined upper limit value $V_H$, the discharge amount of the DC voltage source 105 is increased by still another control.

Figure 12:
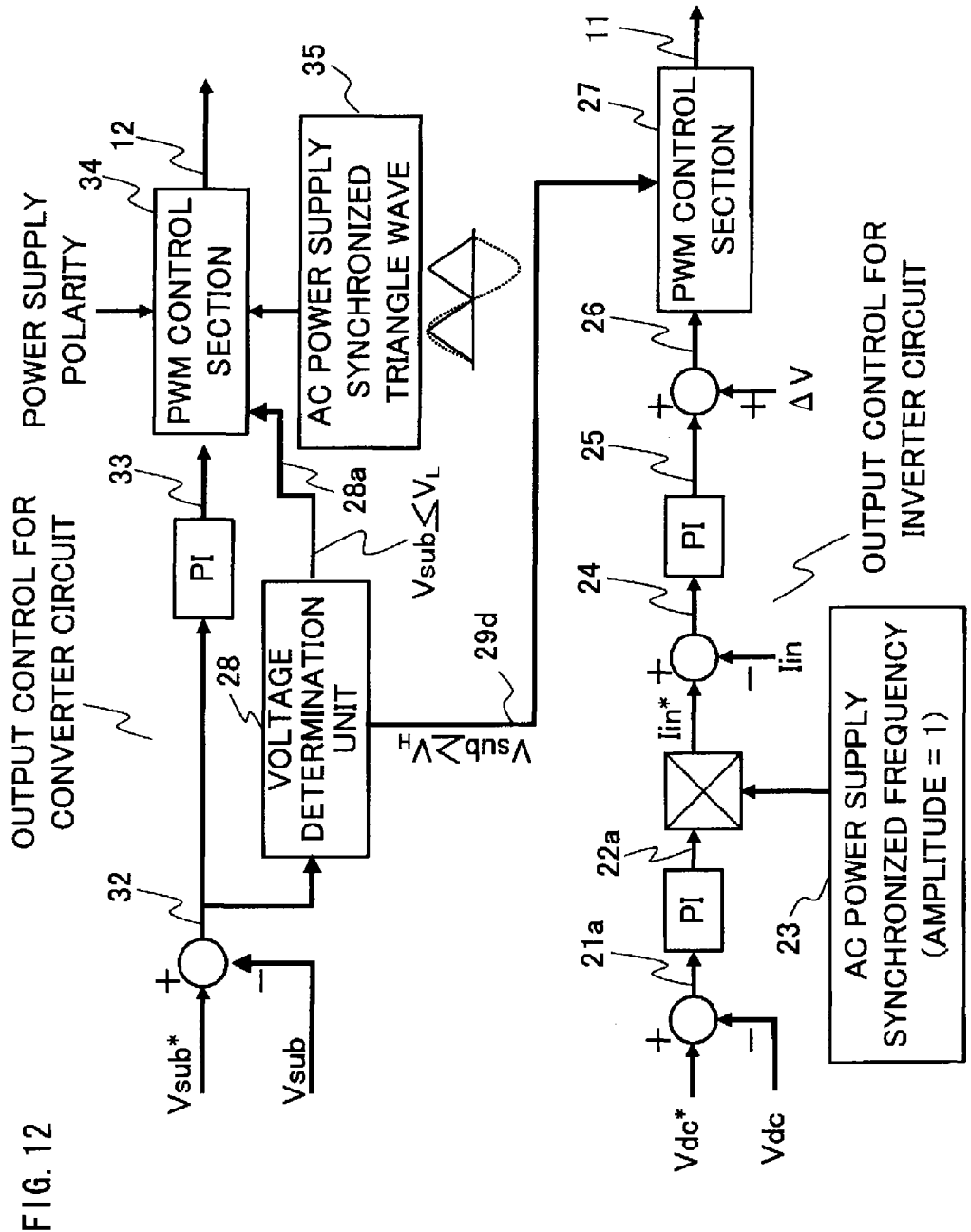
FIG. 12 is a control block diagram showing control by a power conversion apparatus according to embodiment 4 of the present invention.

FIG. 12 is a control block diagram by the control circuit 10 of a power conversion apparatus according to embodiment 4 of the present invention, and shows output control for the converter circuit 300 and output control for the inverter circuit 100. It is noted that also in this case, the configuration of the main circuit is the same as that of the above embodiment 1.

Although the output control for the converter circuit 300 is the same as that described in FIG. 9 in the above embodiment 1, in this case, when the difference 32 between the instruction value Vsub* and the detected voltage Vsub has become out of the set range, the voltage determination unit 28 which receives the difference 32 outputs the same control signal 28a as in the above embodiment 1 for changing the control for the converter circuit 300, and a below-described control signal 29d for changing the control for the inverter circuit 100.

As shown in FIG. 12, in the output control for the inverter circuit 100, the control circuit 10 maintains the DC voltage Vdc of the smoothing capacitor 3 at the target voltage Vdc*, and controls the current Iin such that the power factor of the AC power supply 1 is about 1. The control for the stationary state is the same as that of the above embodiment 1.

In addition, when the voltage Vsub has increased to be equal to or higher than the predetermined upper limit value $V_H$, the control signal 29d is outputted from the voltage determination unit 28 to the PWM control section 27, based on the difference 32 between the instruction value Vsub* and the detected voltage Vsub, whereby the control is changed from that for the stationary state described above. That is, the PWM control section 27 causes each of the semiconductor switching devices 101a to 104a to continue to be in a predetermined switching state until the voltage Vsub of the DC voltage source 105 becomes a required voltage, and performs control such that a current flows in the direction causing the DC voltage source 105 to discharge in the inverter circuit 100.

Thus, it is possible to increase the discharge amount of the DC voltage source 105 of the inverter circuit 100 to promptly recover the voltage Vsub of the DC voltage source 105, thereby providing the same effect.

Embodiment 5

In the above embodiments 1 to 4, only the power running operation of the power conversion apparatus has been described. On the other hand, in embodiment 5, the power conversion apparatus has a regeneration function. Normally, the power conversion apparatus performs the power running operation, but when the voltage of the smoothing capacitor 3 has increased, the power conversion apparatus regenerates power to the AC power supply 1 through regeneration operation. It is noted that the circuit configuration is the same as that shown in FIG. 1, and the power running operation is the same as that of the above embodiment 1.

FIGS. 13 to 16 show current route diagrams in the regeneration operation. When the voltage Vdc of the smoothing capacitor 3 has increased by a predetermined voltage from the target voltage Vdc*, the control circuit 10 switches the control for the power conversion apparatus from the power running operation to the regeneration operation.

First, the case where the voltage Vin of the AC power supply 1 is positive, that is, $\theta$ is in a range of $0 \le \theta < \pi$, will be described.

In the inverter circuit 100, when the semiconductor switching devices 101a and 104a are ON and the semiconductor switching devices 102a and 103a are OFF, a current flows so as to cause the DC voltage source 105 to discharge, and when the semiconductor switching devices 102a and 103a are ON and the semiconductor switching devices 101a and 104a are OFF, a current flows so as to charge the DC voltage source 105. On the other hand, when the semiconductor switching devices 101a and 103a are ON and the semiconductor switching devices 102a and 104a are OFF, and when the semiconductor switching devices 102a and 104a are ON and the semiconductor switching devices 101a and 103a are OFF, a current flows without flowing in the DC voltage source 105. The control circuit 10 controls the semiconductor switching devices 101a to 104a by a combination of the four types of control as described above, to control the current Iin such that the power factor of the AC power supply 1 is about (−1) and perform output control for the inverter circuit 100 by PWM control, thereby causing the DC voltage source 105 to perform charge and discharge, and superimposing the generated voltage on the AC side onto the voltage Vin which is an output of the AC power supply 1. It is noted that when the current flowing in each of the semiconductor switching devices 101a to 104a flows from the emitter to the collector thereof, the semiconductor switching device may be turned off so as to cause the current to flow in the corresponding one of the diodes 101b to 104b connected in antiparallel to said semiconductor switching device.

Figure 13:
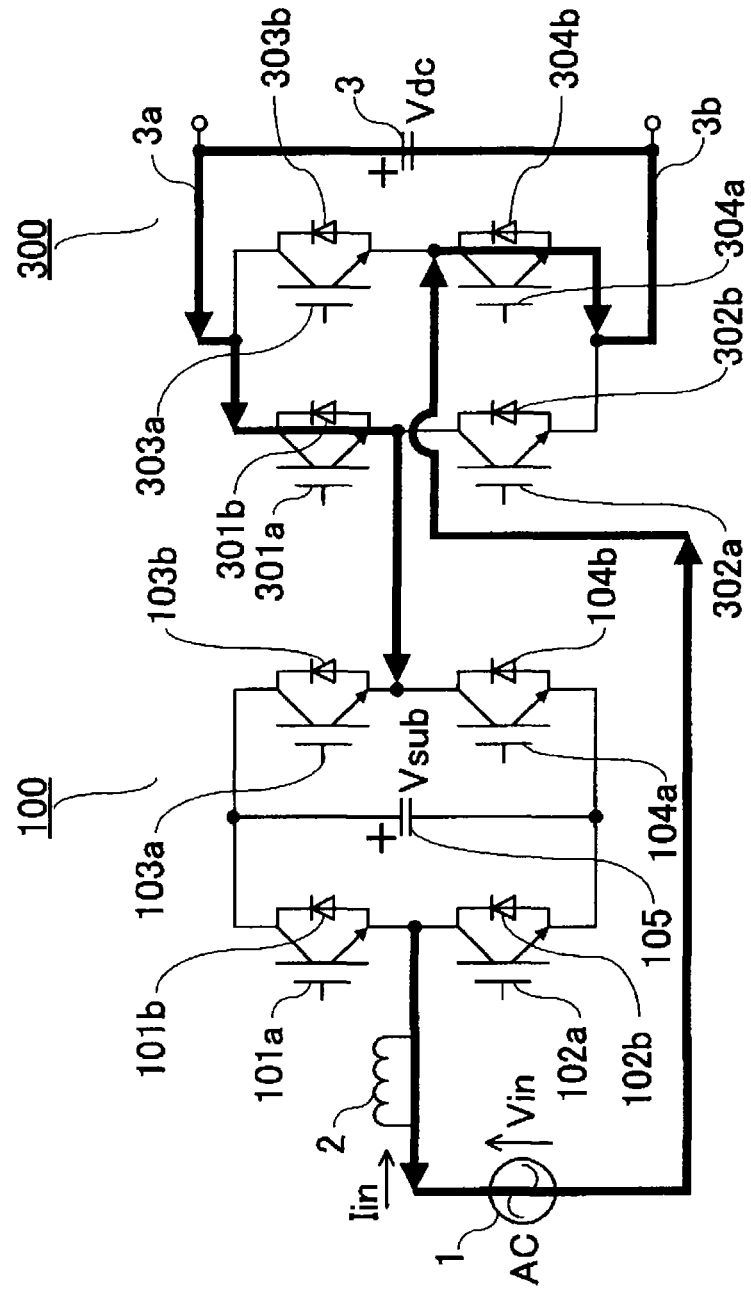
FIG. 13 is a current route diagram for illustrating a regeneration operation of a power conversion apparatus according to embodiment 5 of the present invention.

As shown in FIG. 13, in the converter circuit 300, the semiconductor switching devices 301a and 304a are turned on. A current from the positive terminal of the smoothing capacitor 3 passes through the semiconductor switching device 301a of the converter circuit 300, to be inputted to the inverter circuit 100. The current from the inverter circuit 100 passes through the reactor 2, to be regenerated to the AC power supply 1, and then, from the other terminal of the AC power supply 1, passes through the semiconductor switching device 304a of the converter circuit 300, to return to the negative terminal of the smoothing capacitor 3. At this time, the control circuit 10 causes the inverter circuit 100 to perform PWM operation, by a combination of the above four types of control, thereby causing the DC voltage source 105 to perform discharge, or charge and discharge, and thus performing the current control. The DC voltage source 105 is charged with energy from the smoothing capacitor 3, and meanwhile, in the case of discharging (step-up operation), energy from the DC voltage source 105 is regenerated, together with energy from the smoothing capacitor 3, to the AC power supply 1.

Figure 14:
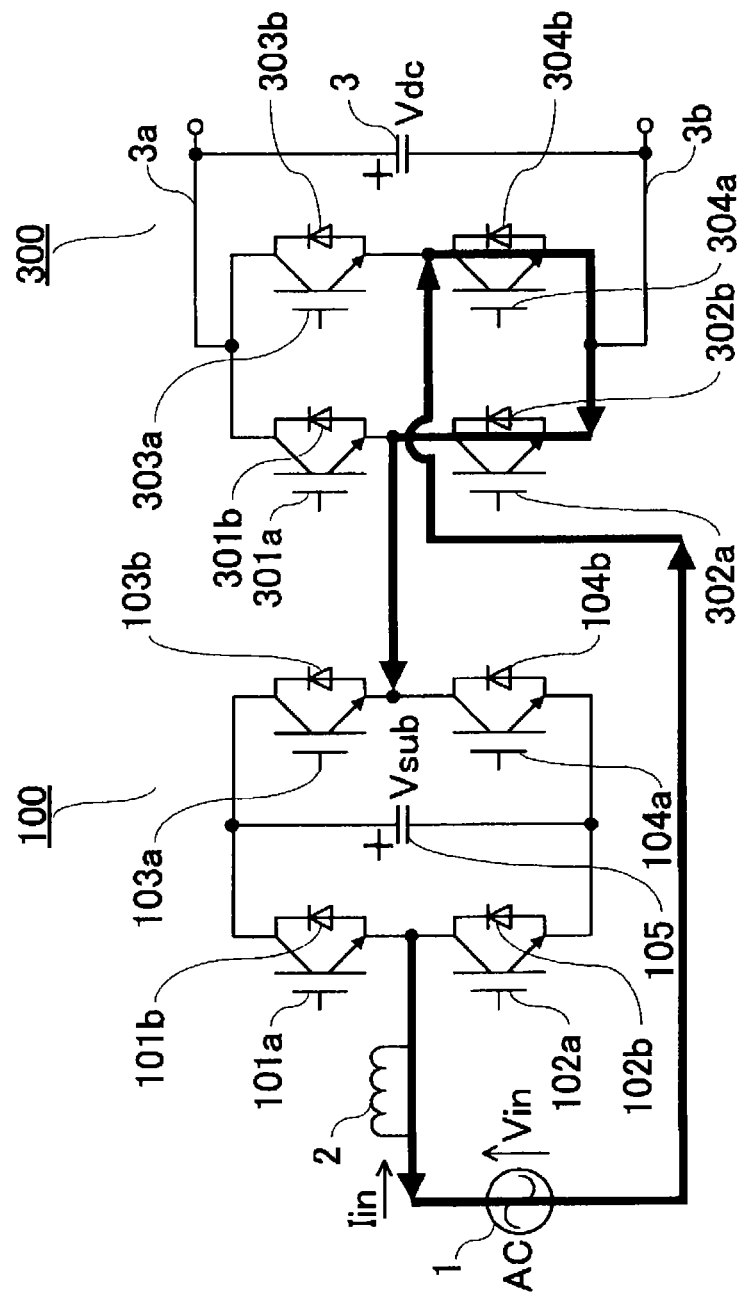
FIG. 14 is a current route diagram for illustrating the regeneration operation of the power conversion apparatus according to embodiment 5 of the present invention.

In the short-circuit period T which corresponds to a phase range between $\pm\theta_1$ centered at the zero cross phase of the voltage Vin of the AC power supply 1, as shown in FIG. 14, the control circuit 10 turns on the semiconductor switching device 304a which is a short-circuit switch in the converter circuit 300, thereby bypassing the smoothing capacitor 3. A current from the positive terminal in the inverter circuit 100 passes through the reactor 2, to be regenerated to the AC power supply 1. Then, from the other terminal of the AC power supply 1, the current passes through the semiconductor switching device 304a and the diode 302b of the converter circuit 300, and is inputted to the inverter circuit 100, to return to the negative terminal of the DC voltage source 105. At this time, the control circuit 10 causes the inverter circuit 100 to perform PWM operation, by a combination of control for causing the DC voltage source 105 to discharge and control for causing a current not to flow therein, thereby causing the DC voltage source 105 to discharge and thus performing the current control.

Next, the case where the voltage Vin is negative, that is, $\theta$ is in a range of $\pi \le \theta < 2\pi$, will be described.

In the inverter circuit 100, when the semiconductor switching devices 102a and 103a are ON and the semiconductor switching devices 101a and 104a are OFF, a current flows so as to cause the DC voltage source 105 to discharge, and when the semiconductor switching devices 101a and 104a are ON and the semiconductor switching devices 102a and 103a are OFF, a current flows so as to charge the DC voltage source 105. On the other hand, when the semiconductor switching devices 101a and 103a are ON and the semiconductor switching devices 102a and 104a are OFF, and when the semiconductor switching devices 102a and 104a are ON and the semiconductor switching devices 101a and 103a are OFF, a current flows without flowing in the DC voltage source 105. The control circuit 10 controls the semiconductor switching devices 101a to 104a by a combination of the four types of control as described above, to control the current Iin such that the power factor of the AC power supply 1 is about (−1) and perform output control for the inverter circuit 100 by PWM control, thereby causing the DC voltage source 105 to perform charge and discharge, and superimposing the generated voltage on the AC side onto the voltage Vin which is an output of the AC power supply 1.

Figure 15:
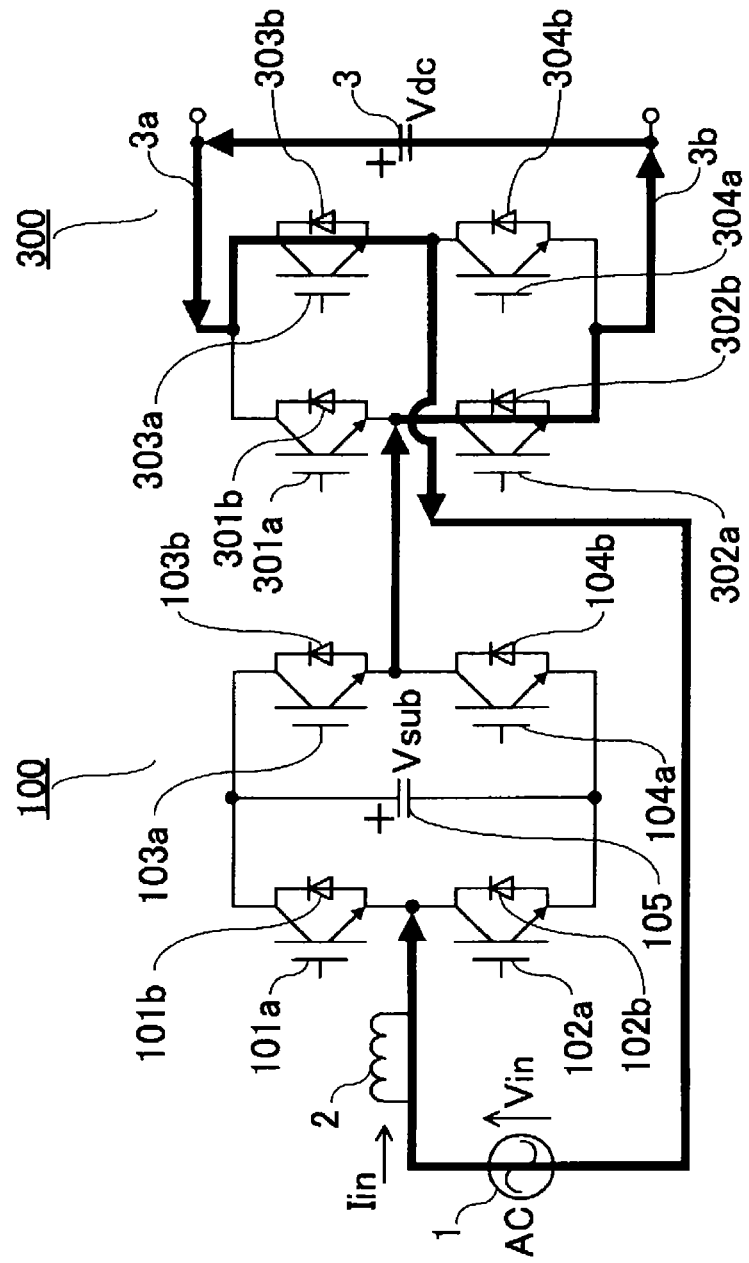
FIG. 15 is a current route diagram for illustrating the regeneration operation of the power conversion apparatus according to embodiment 5 of the present invention.

As shown in FIG. 15, in the converter circuit 300, the semiconductor switching devices 302a and 303a are turned on. A current from the positive terminal of the smoothing capacitor 3 passes through the semiconductor switching device 303a of the converter circuit 300 to be regenerated to the AC power supply 1. Then, from the other terminal of the AC power supply 1, the current passes through the reactor 2, to be inputted to the inverter circuit 100, and the current from the inverter circuit 100 passes through the semiconductor switching device 302a of the converter circuit 300, to return to the negative terminal of the smoothing capacitor 3. At this time, the control circuit 10 causes the inverter circuit 100 to perform PWM operation, by a combination of the above four types of control, thereby causing the DC voltage source 105 to perform discharge, or charge and discharge, and thus performing the current control. The DC voltage source 105 is charged with energy from the smoothing capacitor 3, and meanwhile, in the case of discharging (step-up operation), energy from the DC voltage source 105 is regenerated, together with energy from the smoothing capacitor 3, to the AC power supply 1.

Figure 16:
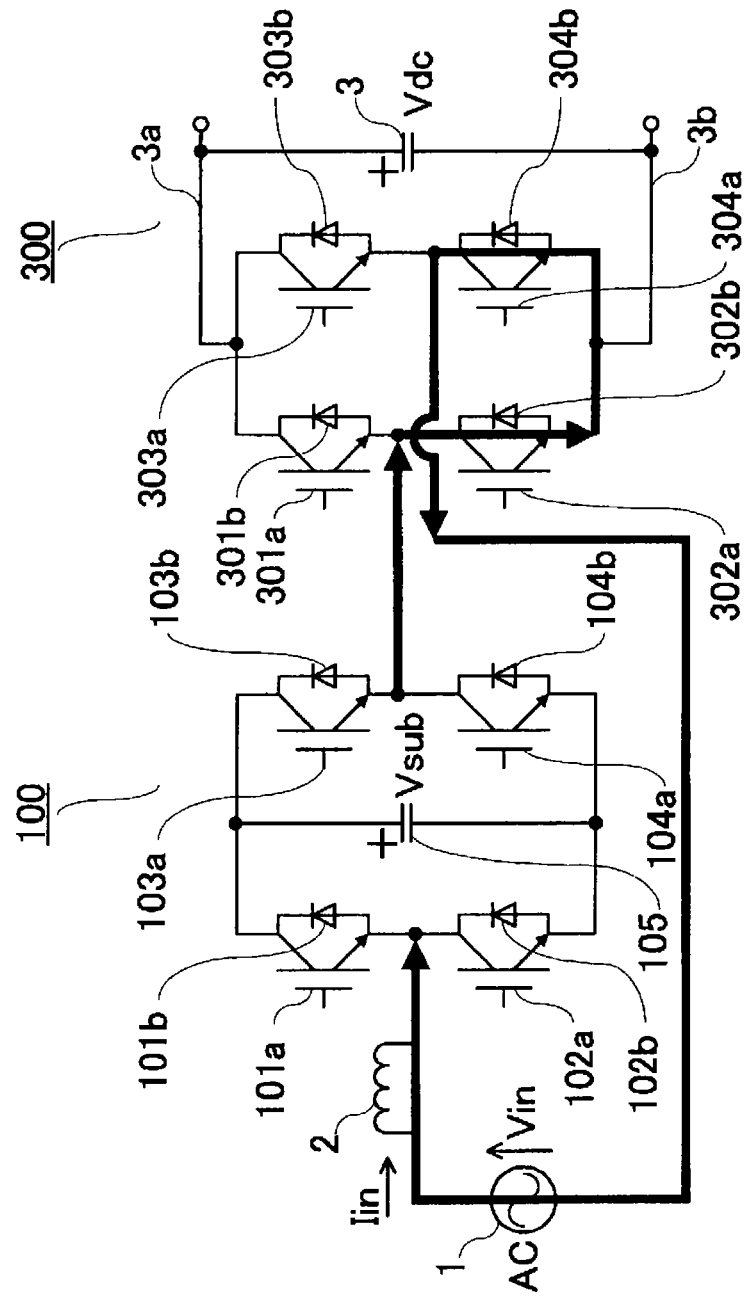
FIG. 16 is a current route diagram for illustrating the regeneration operation of the power conversion apparatus according to embodiment 5 of the present invention.

In the short-circuit period T which corresponds to a phase range between $\pm\theta_1$ centered at the zero cross phase of the voltage Vin of the AC power supply 1, as shown in FIG. 16, the control circuit 10 turns on the semiconductor switching device 302a which is a short-circuit switch in the converter circuit 300, thereby bypassing the smoothing capacitor 3. A current from the positive terminal in the inverter circuit 100 passes through the semiconductor switching device 302a and the diode 304b of the converter circuit 300, to be regenerated to the AC power supply 1. Then, from the other terminal of the AC power supply 1, the current passes through the reactor 2 and is inputted to the inverter circuit 100, to return to the negative terminal of the DC voltage source 105. At this time, the control circuit 10 causes the inverter circuit 100 to perform PWM operation, by a combination of control for causing the DC voltage source 105 to discharge and control for causing a current not to flow therein, thereby causing the DC voltage source 105 to discharge and thus performing the current control.

In the control for the converter circuit 300, whether the voltage Vin is positive or negative, in the short-circuit period T, the control circuit 10 may turn on the two semiconductor switching devices 302a and 304a as short-circuit switches or may turn on the other two semiconductor switching devices 301a and 303a as short-circuit switches.

As described above, also in the regeneration operation, as in the power running operation, when the voltage phase θ of the AC power supply 1 is (the zero cross phase ($\theta=0, \pi$)±$\theta_1$), the control circuit 10 switches the control for the converter circuit 300, and only in the short-circuit period T between $\pm\theta_1$ centered at the zero cross phase, the smoothing capacitor 3 is bypassed. At this time, the control circuit 10 performs the output control for the inverter circuit 100 so as to generate, in the inverter circuit 100, a voltage substantially equal to the opposite polarity voltage of the voltage Vin and to control the current Iin such that the input power factor is about (−1), while the DC voltage source 105 discharges. On the other hand, in the phase range other than the short-circuit period, the control circuit 10 performs the output control for the inverter circuit 100 so as to maintain the DC voltage Vdc of the smoothing capacitor 3 at the target voltage Vdc* and to control the current Iin such that the input power factor is about (−1). At this time, when the absolute value of the voltage Vin is equal to or lower than the target voltage Vdc* of the smoothing capacitor 3, the DC voltage source 105 is charged, and when the absolute value of the voltage Vin is equal to or higher than the target voltage Vdc*, the DC voltage source 105 discharges.

It is noted that although the short-circuit period T is centered at the zero cross phase ($\theta=0, \pi$), the short-circuit period T may be a range, including the zero cross phase, whose center is deviated in either direction.

Figure 17:
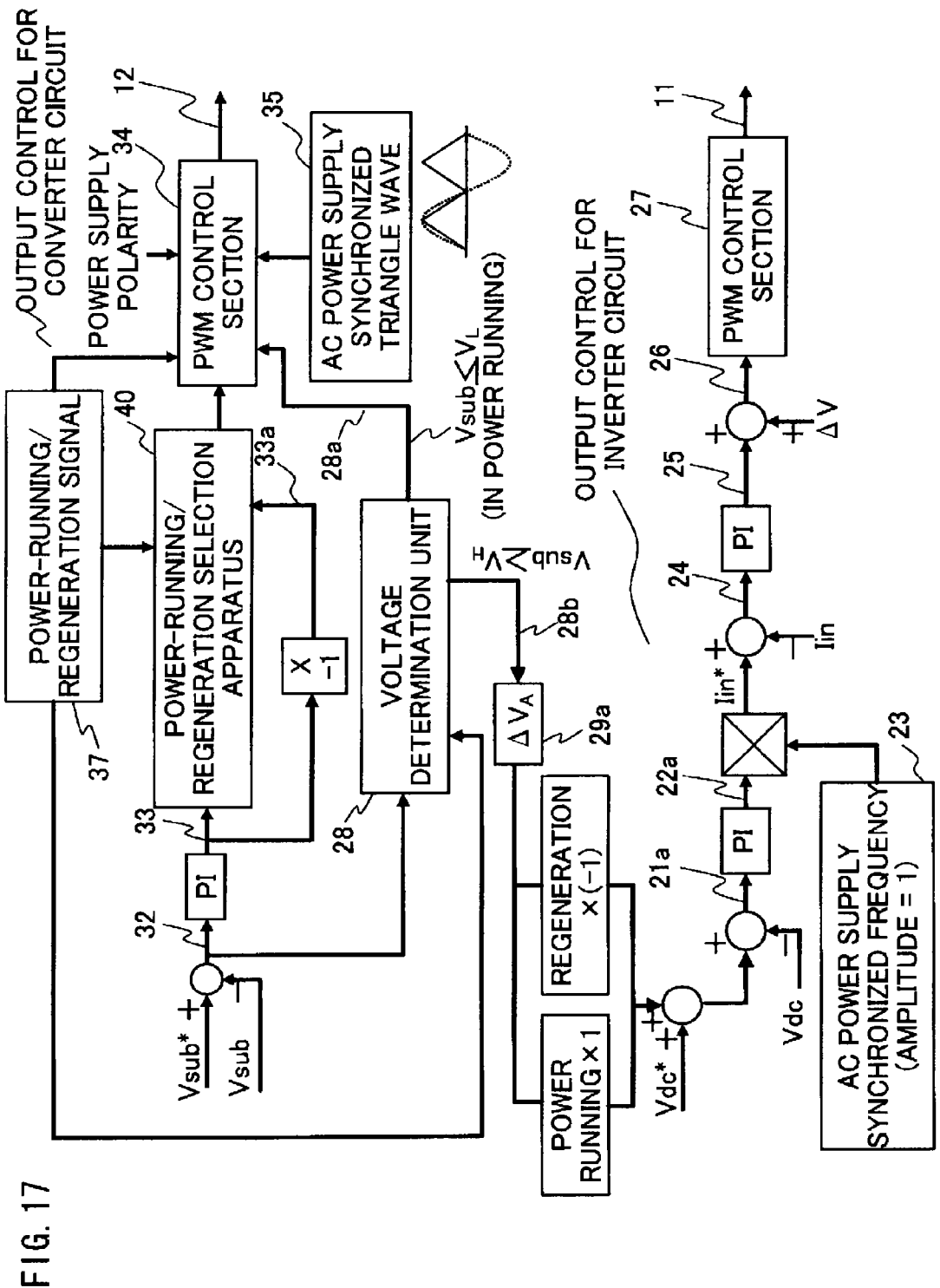
FIG. 17 is a control block diagram showing control by the power conversion apparatus according to embodiment 5 of the present invention.

Next, control for the inverter circuit 100 and the converter circuit 300 will be described in detail below with reference to FIG. 17. FIG. 17 is a control block diagram by the control circuit 10, and shows output control for the converter circuit 300 and output control for the inverter circuit 100.

As shown in FIG. 17, in output control for the converter circuit 300, the control circuit 10 causes the voltage Vsub of the DC voltage source 105 of the inverter circuit 100 to follow an instruction value Vsub*.

First, as in the above embodiment 1, the control circuit 10 inputs the output 33 obtained by PI control using as a feedback amount the difference 32 between the set instruction value Vsub* and the detected voltage Vsub, to a power-running/regeneration selection apparatus 40. In addition, a signal 33a obtained by inverting the polarity of the output 33 obtained by the PI control is also inputted to the power-running/regeneration selection apparatus 40. Based on a power-running/regeneration signal 37, the output 33 is selected and outputted in the power running operation, and the signal 33a is selected and outputted in the regeneration operation.

Then, based on the output from the power-running/regeneration selection apparatus 40 as a voltage instruction, the gate signal 12 for each of the semiconductor switching devices 301a to 304a of the converter circuit 300 is generated by the PWM control section 34. The PWM control section 34 performs comparison operation using, as a carrier wave, the triangle wave (AC power supply synchronized triangle wave) 35 which is synchronized with a period two times as high as the frequency of the AC power supply 1, and generates the gate signal 12 which causes a signal obtained by the comparison operation to operate being substantially centered at the zero cross phase of the voltage Vin of the AC power supply 1, based on the polarity of the AC power supply 1 and the power-running/regeneration signal 37. That is, by the gate signal 12, also the short-circuit period T for short-circuiting the AC terminals of the converter circuit 300 is controlled, so that in the power running operation, the short-circuit period T increases as the voltage Vsub decreases, and the short-circuit period T decreases as the voltage Vsub increases. In addition, in the regeneration operation, the short-circuit period T is controlled so that the short-circuit period T decreases as the voltage Vsub decreases, and the short-circuit period T increases as the voltage Vsub increases.

At a phase of (the zero cross phase of the voltage Vin of the AC power supply 1−$\theta_1$), when the control circuit 10 turns the short-circuit switch of the converter circuit 300 from off to on by the gate signal 12, in order to control the current, it is necessary to satisfy a voltage condition of Vp·|sin $\theta_1$|<Vsub. In view of the current control, when the voltage Vsub of the DC voltage source 105 of the inverter circuit 100 has decreased to be out of the above voltage condition, the PWM control section 34 restricts the short-circuit switch from being turned on. Then, when the phase of the voltage Vin approaches the zero cross phase and |Vin|<Vsub has been satisfied, the short-circuit switch is turned from off to on.

The difference 32 between the instruction value Vsub* and the detected voltage Vsub is inputted also to the voltage determination unit 28. When the voltage Vsub has increased and the difference 32 has become out of the set range, the voltage determination unit 28 outputs the control signal 28b for changing the control for the inverter circuit 100 both in the power running operation and in the regeneration operation. When the voltage Vsub has decreased and the difference 32 has become out of the set range, the voltage determination unit 28 outputs the control signal 28a for changing the control for the converter circuit 300 only in the power running operation.

When the voltage Vsub of the DC voltage source 105 of the inverter circuit 100 has decreased to be out of the predetermined voltage condition for the current control as described above, the control circuit 10 restricts the short-circuit switch of the converter circuit 300 from being turned on, thereby prioritizing the current control. If the ON-operation of the short-circuit switch is restricted, the current control is prioritized, but in the power running operation, the voltage Vsub of the DC voltage source 105 is not recovered unless the short-circuit switch is turned on. In the power running operation, as in the above embodiment 1, when the voltage Vsub has further decreased to be equal to or lower than the predetermined lower limit value $V_L$, the control circuit 10 releases the restriction of the ON-operation of the short-circuit switch by the control signal 28a, to charge the DC voltage source 105. As a result, although the current control is temporarily disturbed, it is possible to promptly recover the voltage Vsub of the DC voltage source 105 and to promptly recover the current control for the stationary state in the inverter circuit 100, thereby stably continuing the voltage control for outputting a desired voltage to the smoothing capacitor 3.

In the regeneration operation, when the voltage Vsub of the DC voltage source 105 has decreased to be out of the predetermined voltage condition for the current control, and the control circuit 10 has restricted the short-circuit switch from being turned on to prioritize the current control, the DC voltage source 105 is prevented from being separated from the smoothing capacitor 3 and discharging, and on the contrary, the DC voltage source 105 is charged by regeneration power from the smoothing capacitor 3. Thus, there is no problem.

As shown in FIG. 17, in the output control for the inverter circuit 100 for the stationary state, the control circuit 10 maintains the DC voltage Vdc of the smoothing capacitor 3 at the target voltage Vdc*, and controls the current Iin such that the power factor of the AC power supply 1 is about 1 in the power running operation and is about (−1) in the regeneration operation. In this case, the polarity of the difference 21a between the DC voltage Vdc and the target voltage Vdc* of the smoothing capacitor 3 inverts depending on the power running operation/regeneration operation. Therefore, the control circuit 10 can perform the current control by controlling the inverter circuit 100 in the same manner as in the above embodiment 1, in either the power running operation or the regeneration operation.

When the voltage Vsub has increased to be equal to or higher than the predetermined upper limit value $V_H$, the control signal 28b is outputted from the voltage determination unit 28 to the addition voltage operation unit 29a, based on the difference 32 between the instruction value Vsub* and the detected voltage Vsub, whereby the control is changed from that for the stationary state described above. The addition voltage operation unit 29a outputs the positive voltage $\Delta V_A$ in accordance with the difference 32 between the instruction value Vsub* and the voltage Vsub, so as to add the positive voltage $\Delta V_A$ to the target voltage Vdc* of the smoothing capacitor 3 in the power running operation, and to subtract the positive voltage $\Delta V_A$ from the target voltage Vdc* of the smoothing capacitor 3 in the regeneration operation.

Thus, in the power running operation, the control circuit 10 increases the target voltage Vdc* of the smoothing capacitor 3 to increase the current instruction Iin*, whereby the discharge amount of the DC voltage source 105 of the inverter circuit 100 is increased. On the other hand, in the regeneration operation, the control circuit 10 decreases the target voltage Vdc* of the smoothing capacitor 3 to increase the current instruction Iin*, whereby the discharge amount of the DC voltage source 105 of the inverter circuit 100 is increased.

Thus, when the voltage Vsub has increased to be equal to or higher than the predetermined upper limit value $V_H$, in either the power running operation or the regeneration operation, the control circuit 10 controls the inverter circuit 100 so as to increase the current instruction Iin* to increase the discharge amount of the DC voltage source 105 in comparison with the stationary state, until the voltage Vsub of the DC voltage source 105 of the inverter circuit 100 becomes a required voltage.

As described above, in the present embodiment, the power conversion apparatus outputs DC power in the power running operation such that the voltage of the smoothing capacitor 3 becomes a desired voltage, and when the voltage of the smoothing capacitor 3 has increased by a predetermined voltage, the power conversion apparatus regenerates power to the AC power supply 1 through the regeneration operation. If, for example, an inverter for controlling an electric motor, or the like is connected to the smoothing capacitor 3, when the electric motor decelerates, power returns to the smoothing capacitor 3 and the voltage of the smoothing capacitor 3 increases. Even if the voltage of the smoothing capacitor 3 has increased as described above, power of the smoothing capacitor 3 is regenerated to the AC power supply 1 through the regeneration operation, whereby the smoothing capacitor 3 can be stably controlled to have a desired voltage.

In addition, when the voltage Vsub of the DC voltage source 105 of the inverter circuit 100 has increased to be equal to or higher than the predetermined upper limit value $V_H$, the control circuit 10 changes the control for the inverter circuit 100 from the control for the stationary state, to perform addition/subtraction operation for the target voltage Vdc* of the smoothing capacitor 3 so as to increase the current instruction Iin* in either the power running operation or the regeneration operation. Thus, it is possible to increase the discharge amount of the DC voltage source 105 of the inverter circuit 100 to promptly recover the voltage Vsub of the DC voltage source 105. Therefore, it is possible to promptly recover the current control for the stationary state in the inverter circuit 100, that is, the voltage control for outputting the original target voltage Vdc* to the smoothing capacitor 3, thereby stably continuing the voltage control for outputting a desired voltage to the smoothing capacitor 3.

In addition, when the voltage Vsub of the DC voltage source 105 of the inverter circuit 100 has decreased to be out of the predetermined voltage condition for the current control, the control circuit 10 restricts the short-circuit switch of the converter circuit 300 from being turned on, thereby prioritizing the current control. In the regenerative operation, if the short-circuit switch is restricted from being turned on, the voltage Vsub of the DC voltage source 105 can be recovered. In the power running operation, as in the above embodiment 1, when the voltage Vsub has further decreased to be equal to or lower than the predetermined lower limit value $V_L$, the restriction of the ON-operation of the short-circuit switch is released and the DC voltage source 105 is charged, whereby the voltage Vsub of the DC voltage source 105 can be promptly recovered and the current control for the stationary state in the inverter circuit can be promptly recovered. Thus, it is possible to stably continue the voltage control for outputting a desired voltage to the smoothing capacitor.

Embodiment 6

Also in the power conversion apparatus having the regeneration function described in the above embodiment 5, as in the above embodiment 2, the control circuit 10 may increase the amplitude of the AC power supply synchronized frequency 23 to increase the current instruction Iin*.

Figure 18:
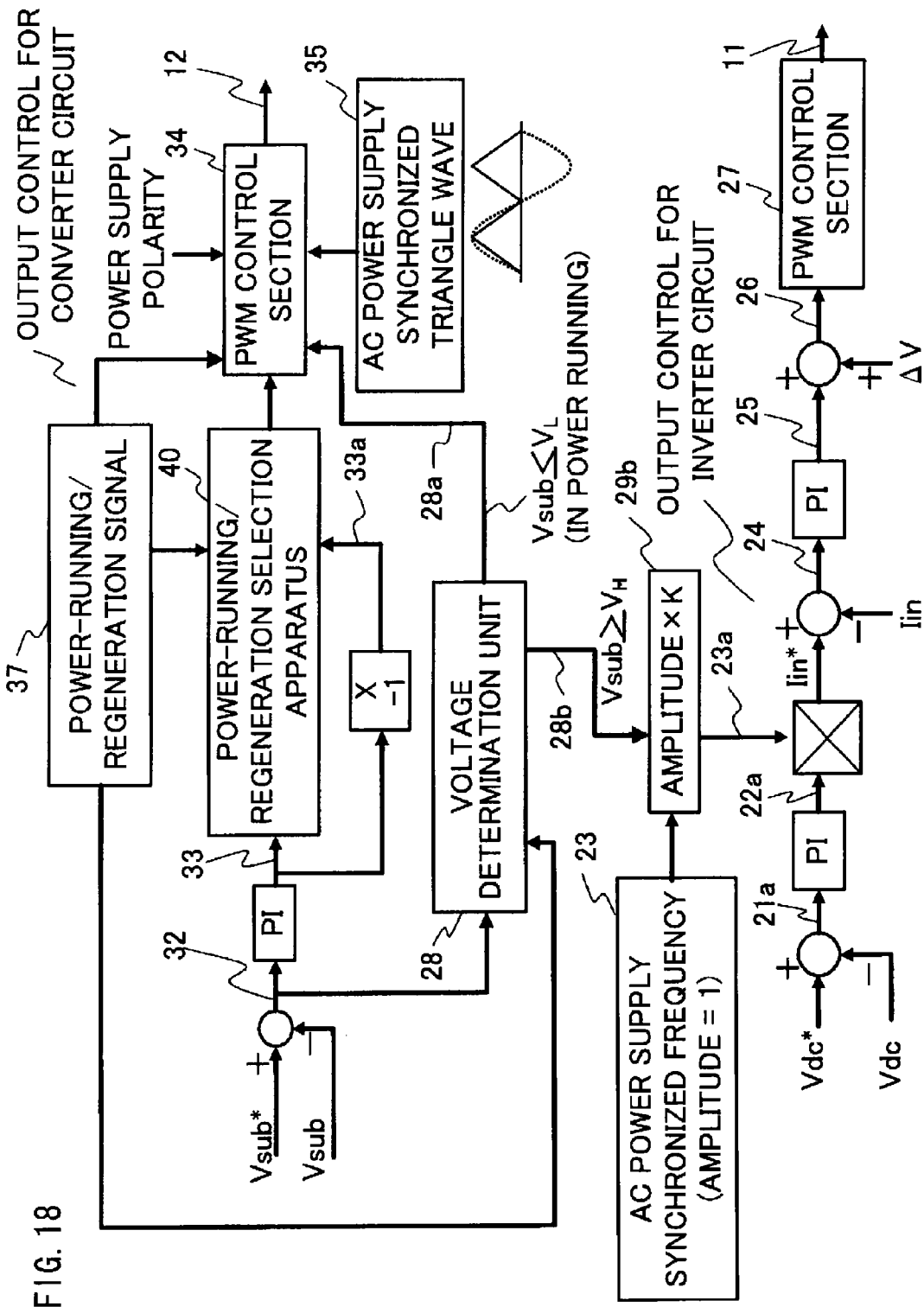
FIG. 18 is a control block diagram showing control by a power conversion apparatus according to embodiment 6 of the present invention.

FIG. 18 is a control block diagram by the control circuit 10 of a power conversion apparatus according to embodiment 6 of the present invention, and shows output control for the converter circuit 300 and output control for the inverter circuit 100. It is noted that the configuration of the main circuit is the same as those of the above embodiments 1 and 5, and the output control for the converter circuit 300 is the same as that shown in FIG. 17 of the above embodiment 5.

When the voltage Vsub has increased to be equal to or higher than the predetermined upper limit value $V_H$, the control signal 28b is outputted from the voltage determination unit 28 to the amplitude multiplication unit 29b, based on the difference 32 between the instruction value Vsub* and the detected voltage Vsub, whereby the control circuit 10 changes the output control for the inverter circuit 100 from the control for the stationary state described above. Then, in either the power running operation or the regeneration operation, the amplitude multiplication unit 29b multiplies the amplitude (=1) of the AC power supply synchronized frequency 23 by a coefficient K corresponding to the difference 32 between the instruction value Vsub* and the voltage Vsub, thereby generating the AC power supply synchronized frequency 23a having an amplitude of K. Then, the current instruction Iin* which is a sine wave synchronized with the voltage Vin is generated from the amplitude target value 22a and the AC power supply synchronized frequency 23a having the amplitude of K.

The other points of the output control for the inverter circuit 100 are the same as those described in FIG. 17 in the above embodiment 5.

Thus, when the voltage Vsub of the DC voltage source 105 of the inverter circuit 100 has increased to be equal to or higher than the predetermined upper limit value $V_H$, the control circuit 10 changes the control for the inverter circuit 100 from the control for the stationary state, and in either the power running operation or the regeneration operation, increases the amplitude of the AC power supply synchronized frequency 23 to increase the current instruction Iin* until the voltage Vsub of the DC voltage source 105 of the inverter circuit 100 becomes a required voltage. Thus, it is possible to increase the discharge amount of the DC voltage source 105 of the inverter circuit 100 to promptly recover the voltage Vsub of the DC voltage source 105, thereby providing the same effect as in the above embodiment 5.

It is noted that the control methods for increasing the current instruction Tin* described in the above embodiments 5 and 6 may be each performed alone or may be performed in a combined manner, to increase the discharge amount of the DC voltage source 105.

Embodiment 7

In the present embodiment, in the power conversion apparatus having the regeneration function, when the voltage Vsub of the DC voltage source 105 of the inverter circuit 100 has increased to be equal to or higher than the predetermined upper limit value $V_H$, the discharge amount of the DC voltage source 105 is increased by the same control as in the above embodiment 4.

Figure 19:
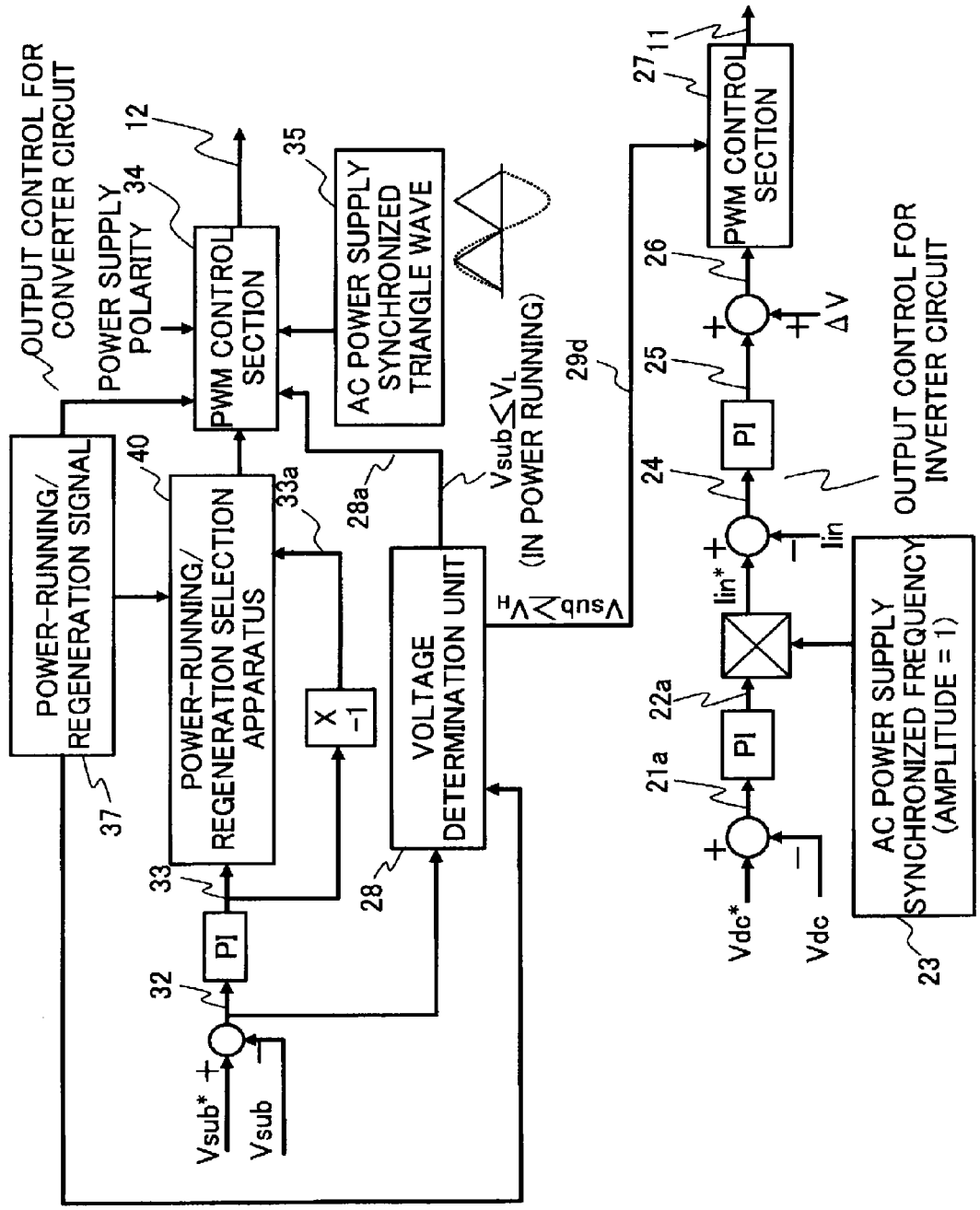
FIG. 19 is a control block diagram showing control by a power conversion apparatus according to embodiment 7 of the present invention.

FIG. 19 is a control block diagram by the control circuit 10 of a power conversion apparatus according to embodiment 7 of the present invention, and shows output control for the converter circuit 300 and output control for the inverter circuit 100. It is noted that also in this case, the configuration of the main circuit is the same as those of the above embodiments 1 and 5.

Although the output control for the converter circuit 300 is the same as that described in FIG. 17 in the above embodiment 5, in this case, when the difference 32 between the instruction value Vsub* and the detected voltage Vsub has become out of the set range, the voltage determination unit 28 which receives the difference 32 outputs the same control signal 28a as in the above embodiment 5 for changing the control for the converter circuit 300, and the control signal 29d for changing the control for the inverter circuit 100.

When the voltage Vsub has increased to be equal to or higher than the predetermined upper limit value $V_H$, the control signal 29d is outputted from the voltage determination unit 28 to the PWM control section 27, based on the difference 32 between the instruction value Vsub* and the detected voltage Vsub, whereby the control circuit 10 changes the output control for the inverter circuit 100 from the control for the stationary state described above. Then, in either the power running operation or the regeneration operation, the PWM control section 27 causes each of the semiconductor switching devices 101a to 104a to continue to be in a predetermined switching state until the voltage Vsub of the DC voltage source 105 becomes a required voltage, and performs control such that a current flows in the direction causing the DC voltage source 105 to discharge in the inverter circuit 100.

The other points of the output control for the inverter circuit 100 are the same as those described in FIG. 17 in the above embodiment 5.

Thus, it is possible to increase the discharge amount of the DC voltage source 105 of the inverter circuit 100 to promptly recover the voltage Vsub of the DC voltage source 105, thereby providing the same effect.

In the above embodiments 5 to 7, in the regenerative operation, when the voltage Vsub further increases from the upper limit value $V_H$ to exceed a predetermined voltage even though the output control for the inverter circuit 100 has been changed so as to increase the discharge amount of the DC voltage source 105, the short-circuit switch may be turned on in the control for the converter circuit 300, to separate the DC voltage source 105 from the smoothing capacitor 3 and cause the DC voltage source 105 to discharge, whereby power may be regenerated to the AC power supply 1.

Embodiment 8

Figure 20:
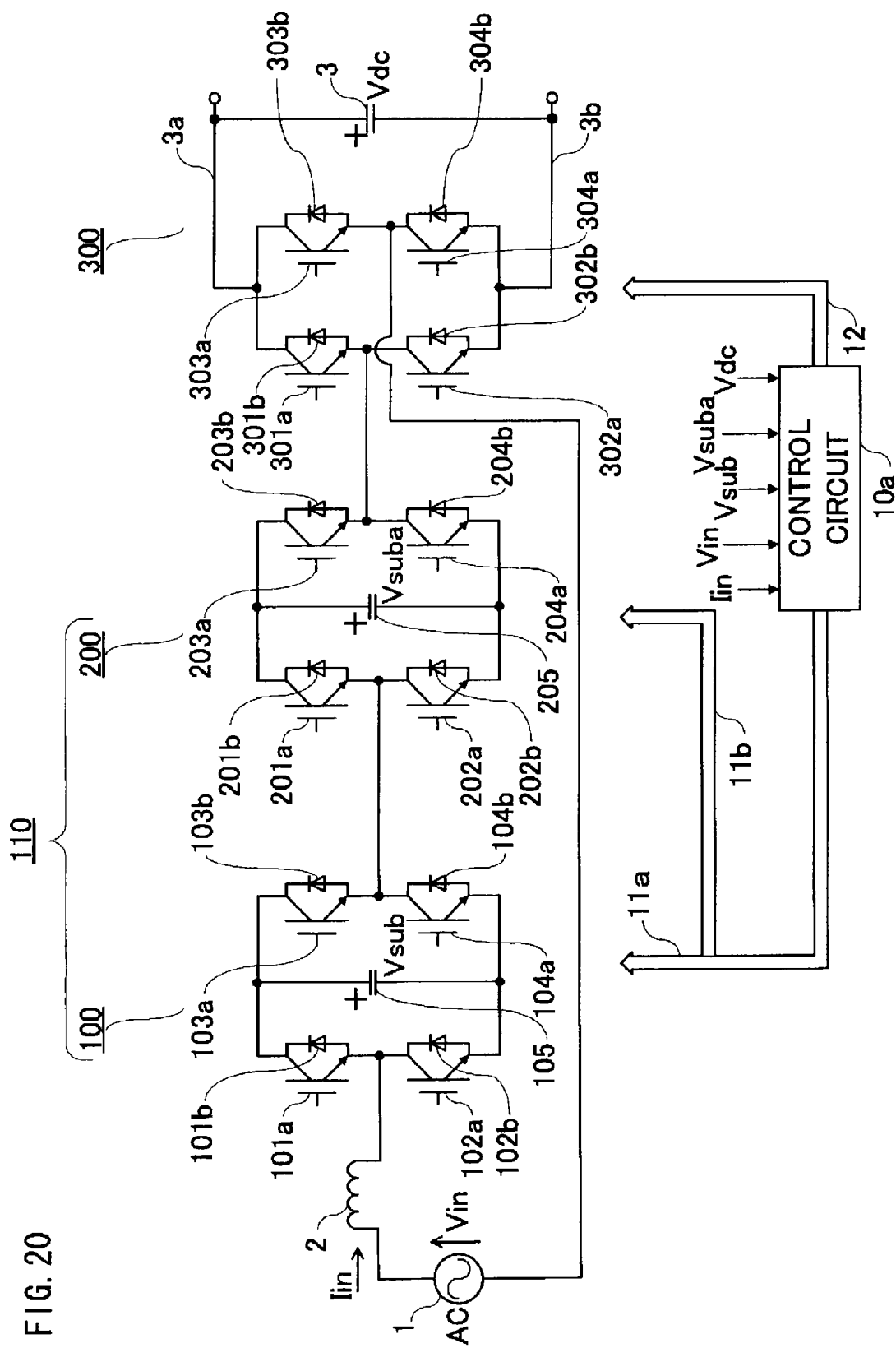
FIG. 20 is a configuration diagram of a power conversion apparatus according to embodiment 8 of the present invention.

In the above embodiments, the inverter circuit 100 is composed of one single-phase inverter. However, as shown in FIG. 20, an inverter circuit 110 may be composed of a plurality of single-phase inverters 100 and 200 whose AC sides are connected in series. As in the above embodiment 1, the single-phase inverters 100 and 200 are inverters with a full-bridge configuration, respectively composed of: a plurality of self-turn-off semiconductor switching devices 101a to 104a and 201a to 204a such as IGBTs, to which diodes 101b to 104b and 201b to 204b are respectively connected in antiparallel; and DC voltage sources 105 and 205. In this case, the sum of the outputs of the single-phase inverters 100 and 200 is the output of the inverter circuit 110.

Based on voltages Vsub and Vsuba of the DC voltage sources 105 and 205 of the single-phase inverters 100 and 200, the voltage Vdc of the smoothing capacitor 3, and the voltage Vin and the current Iin from the AC power supply 1, as in the above embodiments, a control circuit 10a performs output control for the inverter circuit 100 by using the current instruction Iin*, such that the voltage Vdc of the smoothing capacitor 3 follows a target voltage and that the power factor from the AC power supply 1 approaches 1 in the power running operation and approaches (−1) in the regeneration operation. In addition, the control circuit 10a performs output control for the converter circuit 300 such that the voltage Vsub of the DC voltage source 105 of the inverter circuit 100 follows the instruction value Vsub*, by providing the short-circuit period T for bypassing the smoothing capacitor 3. Then, the generated voltage on the AC side of the inverter circuit 110 is superimposed onto the voltage Vin of the AC power supply 1.

Also in the present embodiment, when the voltages of the DC voltage sources 105 and 205 of the inverter circuit 110 have increased to be equal to or higher than a predetermined upper limit value, as in the above embodiments, the control circuit 10a changes the control for the inverter circuit 110 from that for the stationary state, to increase the discharge amounts of the DC voltage sources 105 and 205. In addition, when the voltages of the DC voltage sources 105 and 205 have decreased to be out of a predetermined voltage condition for the current control, the control circuit 10a restricts the short-circuit switch of the converter circuit 300 from being turned on, thereby prioritizing the current control. Then, in the power running operation, when the voltages of the DC voltage sources 105 and 205 have further decreased to be equal to or lower than a predetermined lower limit value, the restriction of ON-operation of the short-circuit switch is released, and the DC voltage sources 105 and 205 are charged.

Thus, even if the voltages of the DC voltage sources 105 and 205 of the inverter circuit 110 have greatly varied, as in the above embodiments, it is possible to promptly recover the voltages of the DC voltage sources 105 and 205 and to promptly recover the current control for the stationary state in the inverter circuit 110, thereby stably continuing the voltage control for outputting a desired voltage to the smoothing capacitor.

It is noted that the inverter circuit 110 may obtain its output by gradational control which generates a step-like voltage waveform by using the sum of the outputs of the plurality of single-phase inverters, or may perform PWM control for only a specific single-phase inverter among the plurality of single-phase inverters.

Embodiment 9

Figure 21:
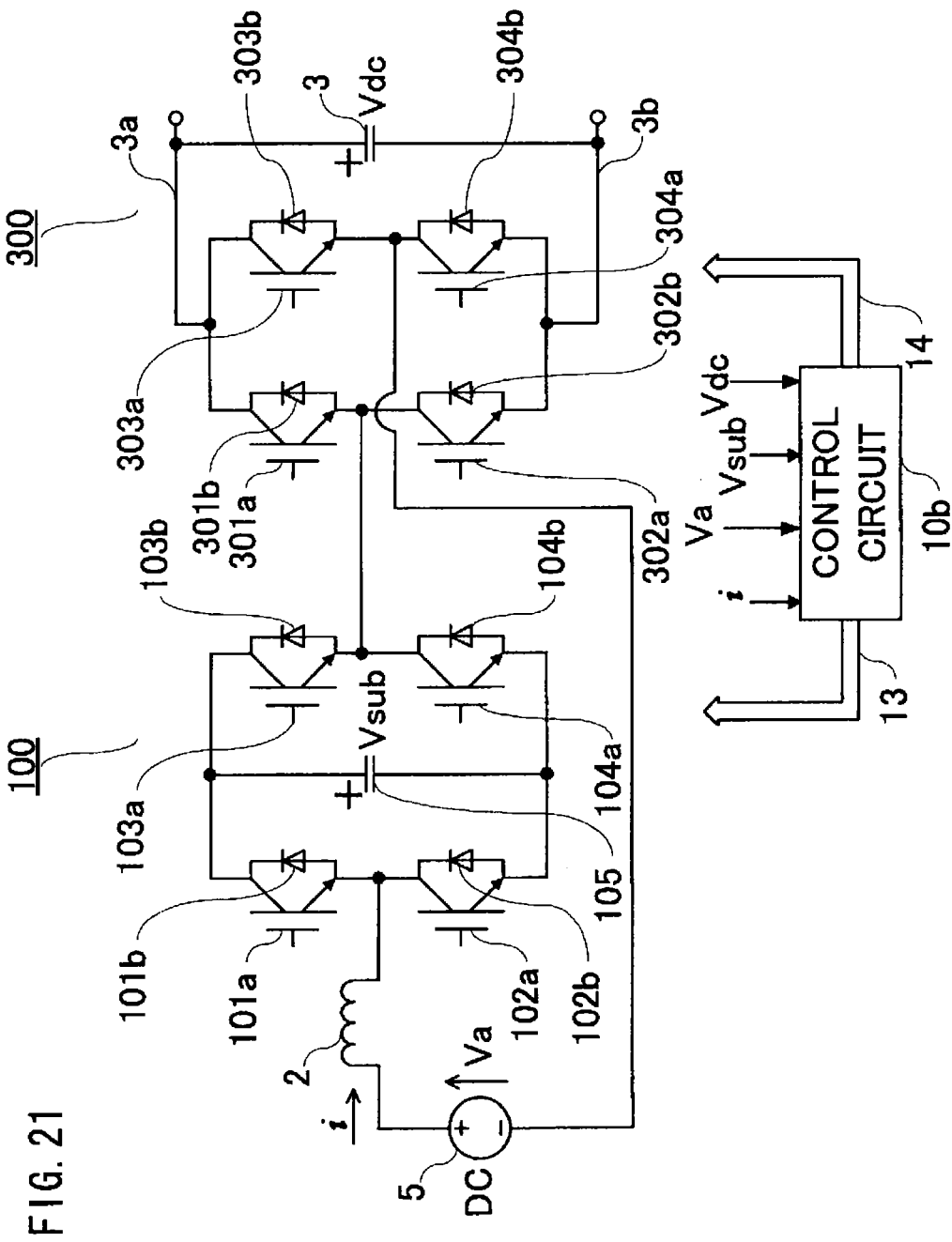
FIG. 21 is a configuration diagram of a power conversion apparatus according to embodiment 9 of the present invention.

Next, a power conversion apparatus according to embodiment 9 of the present invention will be described. FIG. 21 is a schematic configuration diagram of the power conversion apparatus according to embodiment 9.

As shown in FIG. 21, the same main circuit as that of the above embodiment 1 is connected to a DC power supply 5, to obtain a desired DC voltage. Based on the voltage Vsub of the DC voltage source 105 of the inverter circuit 100, the voltage Vdc of the smoothing capacitor 3, and a DC voltage Va and a current i from the DC power supply 5, a control circuit 10b generates a gate signal 13 to the semiconductor switching devices 101a to 104a of the inverter circuit 100, and a gate signal 14 to the semiconductor switching devices 301a to 304a of the converter circuit 300, such that the voltage Vdc of the smoothing capacitor 3 is the constant target voltage Vdc*, thereby performing output control for the inverter circuit 100 and the converter circuit 300.

The control circuit 10b charges the DC voltage source 105 of the inverter circuit 100 by providing a short-circuit period in a predetermined cycle during which the AC terminals of the converter circuit 300 are short-circuited to bypass the smoothing capacitor 3, and in the periods other than the short-circuit period, superimposes the output of the inverter circuit 100 onto the voltage Va of the DC power supply 5 and outputs the resultant voltage to the smoothing capacitor 3, thereby controlling the voltage Vdc of the smoothing capacitor 3 to be the target voltage Vdc*. In this case, the voltage Va of the DC power supply 5 is stepped up to obtain the output voltage Vdc.

In addition, as in the above embodiment 5, the power conversion apparatus has the regeneration function. When the voltage Vdc of the smoothing capacitor 3 has increased by a predetermined voltage from the target voltage Vdc*, the control circuit 10b switches the power running operation to the regeneration operation, to regenerate power to the DC power supply 5.

It is noted that the current routes in the power running operation and the regeneration operation are the same as those described in the above embodiments 1 and 5.

The voltage Vsub of the DC voltage source 105 charged from the DC power supply 5 needs to be set to be lower than the DC voltage Va of the DC power supply 5, and to be equal to or higher than a desired generated voltage of the inverter circuit 100. That is, the voltage Vsub is set so as to satisfy two conditions of Vsub<Va, and Vsub≥Vdc*−Va, whereby the DC voltage Vdc of the smoothing capacitor 3 can be maintained at the target voltage Vdc*.

Figure 22:
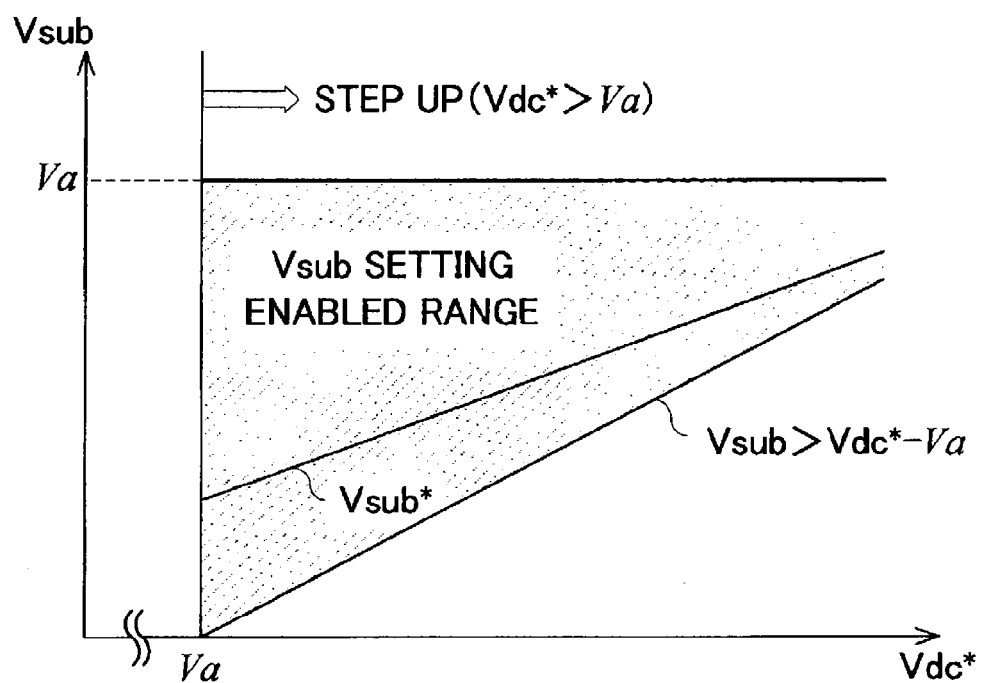
FIG. 22 is a diagram showing a voltage range of a DC voltage source of an inverter circuit according to embodiment 9 of the present invention.

Accordingly, a setting enabled range of the voltage Vsub of the DC voltage source 105 of the inverter circuit 100 is as shown in FIG. 22. Also in this case, in the inverter circuit 100 subjected to PWM control, the loss increases as the voltage Vsub of the DC voltage source 105 increases. Therefore, it is desirable that the voltage Vsub is set to be small under a condition satisfying the above two conditions.

Figure 23:
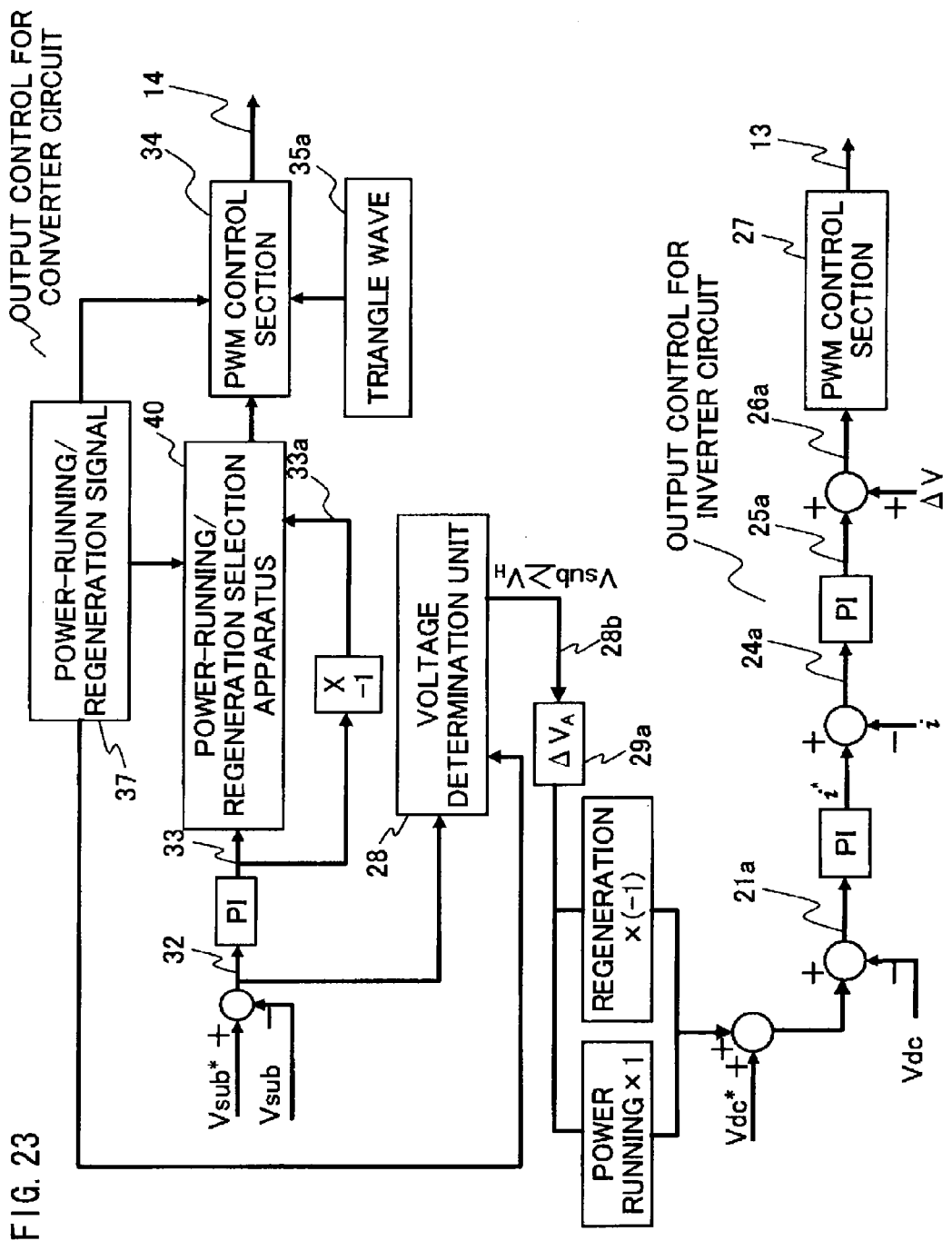
FIG. 23 is a control block diagram showing control by the power conversion apparatus according to embodiment 9 of the present invention.

Next, control for the inverter circuit 100 and the converter circuit 300 will be described in detail below with reference to FIG. 23. FIG. 23 is a control block diagram by the control circuit 10b, and shows output control for the converter circuit 300 and output control for the inverter circuit 100.

As shown in FIG. 23, in output control for the converter circuit 300, the control circuit 10b causes the voltage Vsub of the DC voltage source 105 of the inverter circuit 100 to follow an instruction value Vsub*.

First, the control circuit 10b inputs the output 33 obtained by PI control using as a feedback amount the difference 32 between the set instruction value Vsub* and the detected voltage Vsub, to the power-running/regeneration selection apparatus 40. In addition, the signal 33a obtained by inverting the polarity of the output 33 obtained by the PI control is also inputted to the power-running/regeneration selection apparatus 40. Based on the power-running/regeneration signal 37, the output 33 is selected and outputted in the power running operation, and the signal 33a is selected and outputted in the regeneration operation. Then, based on the output from the power-running/regeneration selection apparatus 40 as a voltage instruction, the gate signal 14 for each of the semiconductor switching devices 301a to 304a of the converter circuit 300 is generated by the PWM control section 34. The PWM control section 34 performs comparison operation using, as a carrier wave, a triangle wave 35a which is generated in a given cycle corresponding to the cycle of the short-circuit period, and generates the gate signal 14, from a signal obtained by the comparison operation, based on the power-running/regeneration signal 37.

That is, by the gate signal 14, also the short-circuit period for short-circuiting the AC terminals of the converter circuit 300 is controlled, so that in the power running operation, the short-circuit period increases as the voltage Vsub decreases, and the short-circuit period decreases as the voltage Vsub increases. In addition, in the regeneration operation, the short-circuit period is controlled so that the short-circuit period decreases as the voltage Vsub decreases, and the short-circuit period increases as the voltage Vsub increases.

The difference 32 between the instruction value Vsub* and the detected voltage Vsub is inputted also to the voltage determination unit 28. When the voltage Vsub has increased and the difference 32 has become out of the set range, the voltage determination unit 28 outputs the control signal 28b for changing the control for the inverter circuit 100 both in the power running operation and in the regeneration operation.

As shown in FIG. 23, in the output control for the inverter circuit 100, the control circuit 10b maintains the DC voltage Vdc of the smoothing capacitor 3 at the target voltage Vdc*. In control for stationary state, the control circuit 10b obtains, as a current instruction i*, an output by PI control using as a feedback amount the difference 21a between the DC voltage Vdc and the target voltage Vdc* of the smoothing capacitor 3. Then, the control circuit 10 obtains an output by PI control using as an feedback amount a difference 24a between the current instruction i* and the detected current i, and the obtained output is used as a voltage instruction 25a which is a target value of the generated voltage of the inverter circuit 100. At this time, the control circuit 10 corrects the voltage instruction 25a by adding thereto the feedforward correction voltage ΔV synchronized with a time of switching between control in the short-circuit period for short-circuiting the AC terminals of the converter circuit 300, and control for making each AC terminal of the converter circuit 300 conductive with the smoothing capacitor 3, that is, control in the periods other than the short-circuit period. Then, based on the corrected voltage instruction 26a, the control circuit 10 generates, by the PWM control section 27, the gate signal 13 for each of the semiconductor switching devices 101a to 104a of the inverter circuit 100, thereby operating the inverter circuit 100.

When the voltage Vsub of the DC voltage source 105 of the inverter circuit 100 has increased to be equal to or higher than the predetermined upper limit value $V_H$, the control signal 28b is outputted from the voltage determination unit 28 to the addition voltage operation unit 29a, based on the difference 32 between the instruction value Vsub* and the detected voltage Vsub, whereby the control is changed from that for the stationary state described above. The addition voltage operation unit 29a outputs the positive voltage $\Delta V_A$ in accordance with the difference 32 between the instruction value Vsub* and the voltage Vsub, so as to add the positive voltage $\Delta V_A$ to the target voltage Vdc* of the smoothing capacitor 3 in the power running operation, and to subtract the positive voltage $\Delta V_A$ from the target voltage Vdc* of the smoothing capacitor 3 in the regeneration operation.

Thus, in the power running operation, the control circuit 10b increases the target voltage Vdc* of the smoothing capacitor 3 to increase the current instruction i*, whereby the discharge amount of the DC voltage source 105 of the inverter circuit 100 is increased. On the other hand, in the regeneration operation, the control circuit 10b decreases the target voltage Vdc* of the smoothing capacitor 3 to increase the current instruction i*, whereby the discharge amount of the DC voltage source 105 of the inverter circuit 100 is increased.

Thus, when the voltage Vsub has increased to be equal to or higher than the predetermined upper limit value $V_H$, in either the power running operation or the regeneration operation, the control circuit 10b performs control so as to increase the current instruction i* to increase the discharge amount of the DC voltage source 105 in comparison with the stationary state, until the voltage Vsub of the DC voltage source 105 of the inverter circuit 100 becomes a required voltage. Thus, it is possible to promptly recover the voltage Vsub of the DC voltage source 105, and to promptly recover the current control for the stationary state in the inverter circuit 100, that is, the voltage control for outputting the original target voltage Vdc* to the smoothing capacitor 3, thereby stably continuing the voltage control for outputting a desired voltage to the smoothing capacitor 3.

It is noted that since DC power is inputted from the DC power supply 5, it is not necessary to control the power factor as in the case of using the AC power supply 1. In the power running operation, when the voltage Vsub of the DC voltage source 105 of the inverter circuit 100 has decreased, the voltage Vsub is recovered by charging with an increased short-circuit period.

Embodiment 10

In the present embodiment, in the power conversion apparatus described in the above embodiment 9, when the voltage Vsub of the DC voltage source 105 of the inverter circuit 100 has increased to be equal to or higher than the predetermined upper limit value $V_H$, the discharge amount of the DC voltage source 105 is increased by the same control as in the above embodiments 4 and 7.

Figure 24:
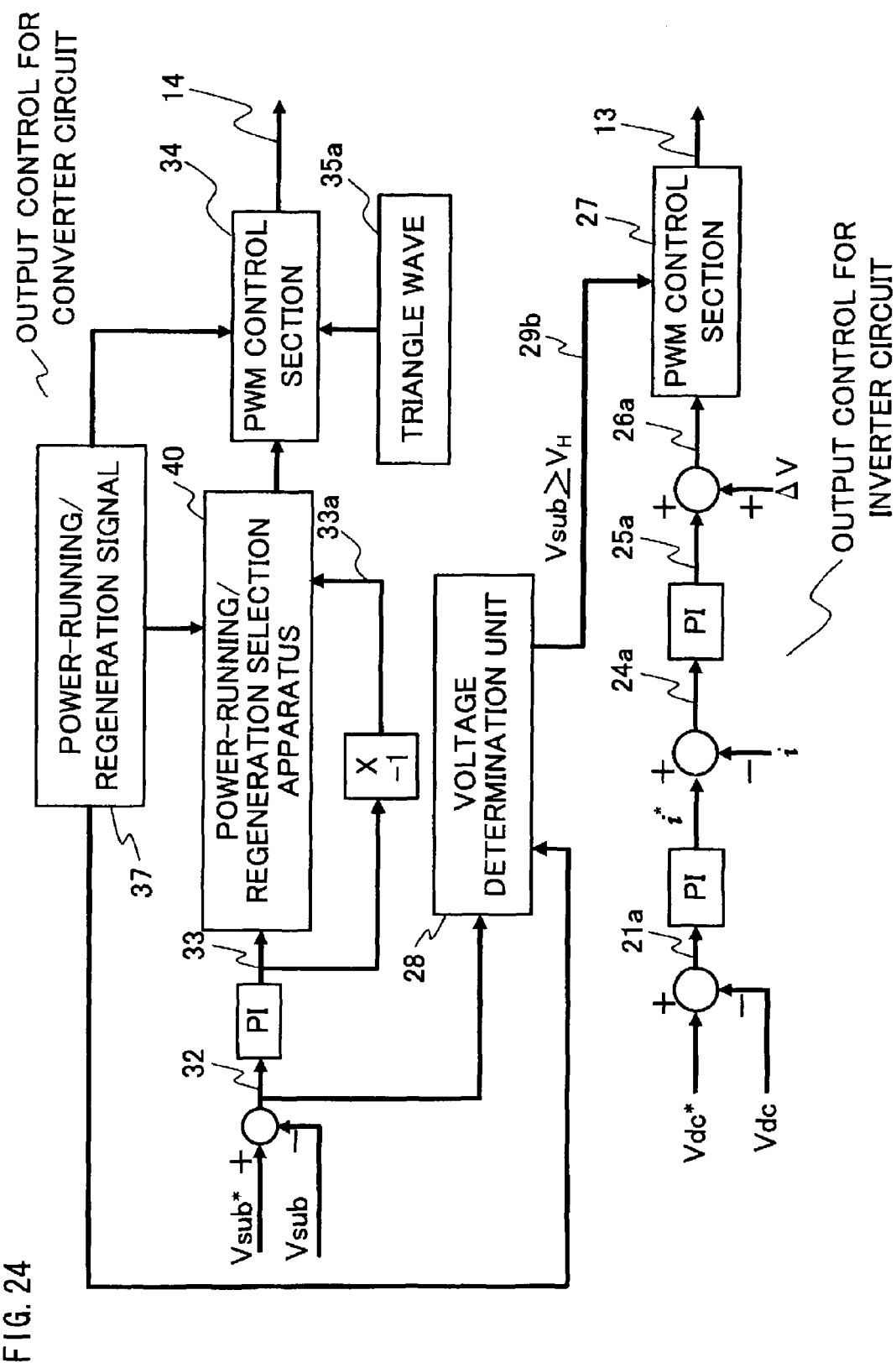
FIG. 24 is a control block diagram showing control by a power conversion apparatus according to embodiment 10 of the present invention.

FIG. 24 is a control block diagram by the control circuit 10b of a power conversion apparatus according to embodiment 10 of the present invention, and shows output control for the converter circuit 300 and output control for the inverter circuit 100. The configuration of the power conversion apparatus is the same as that shown in FIG. 21.

Although the output control for the converter circuit 300 is the same as that described in FIG. 23 in embodiment 9, in this case, when the detected voltage Vsub has increased and the difference 32 between the instruction value Vsub* and the detected voltage Vsub has become out of the set range, the voltage determination unit 28 which receives the difference 32 outputs the control signal 29d for changing the control for the inverter circuit 100.

When the voltage Vsub has increased to be equal to or higher than the predetermined upper limit value $V_H$, the control signal 29d is outputted from the voltage determination unit 28 to the PWM control section 27, based on the difference 32 between the instruction value Vsub* and the detected voltage Vsub, whereby the control circuit 10b changes the output control for the inverter circuit 100 from the control for the stationary state described above. Then, in either the power running operation or the regeneration operation, the PWM control section 27 causes each of the semiconductor switching devices 101a to 104a to continue to be in a predetermined switching state until the voltage Vsub of the DC voltage source 105 becomes a required voltage, and performs control such that a current flows in the direction causing the DC voltage source 105 to discharge in the inverter circuit 100.

The other points of the output control for the inverter circuit 100 are the same as those described in FIG. 23 in embodiment 9.

Thus, it is possible to increase the discharge amount of the DC voltage source 105 of the inverter circuit 100 to promptly recover the voltage Vsub of the DC voltage source 105, thereby providing the same effect.

The invention claimed is:

1. A power conversion apparatus comprising:
an inverter circuit composed of at least one single-phase inverter composed of a plurality of semiconductor switching devices and a DC voltage source, the at least one single-phase inverter having an AC side connected to a first terminal of a power supply;
a converter circuit having a plurality of converter switches connected between DC bus lines, one of AC terminals of the converter circuit being connected to an AC output line of the inverter circuit, and the other AC terminal of the converter circuit being connected to a second terminal of the power supply, the converter circuit providing an output of DC power between the DC bus lines;
a smoothing capacitor, connected between the DC bus lines, which smoothes the output of the converter circuit;
a control circuit which performs output control for the converter circuit so as to cause the voltage of the DC voltage source of the inverter circuit to follow an instruction value, by providing a short-circuit period for short-circuiting the AC terminals of the converter circuit to bypass the smoothing capacitor, and which performs output control for the inverter circuit so as to cause the voltage of the smoothing capacitor to follow a target voltage, by using a current instruction, wherein
the control circuit
in power running operation for outputting power to the smoothing capacitor, controls the converter circuit such that the DC voltage source of the inverter circuit is charged in the short-circuit period, and that the short-circuit period increases as the voltage of the DC voltage source decreases and the short-circuit period decreases as the voltage of the DC voltage source increases, and
when the voltage of the DC voltage source of the inverter circuit has exceeded a predetermined upper limit value, changes the control for the inverter circuit by increasing the current instruction for controlling the inverter circuit, thereby increasing the discharge amount of the DC voltage source.

2. The power conversion apparatus according to claim 1, wherein
the inverter circuit includes plural single-phase inverters having AC sides and each of the plural single-phase inverters is composed of a plurality of semiconductor switching devices and a DC voltage source, the AC sides of the plural single-phase inverters connected in series to the first terminal of the power supply, the inverter circuit superimposing the sum of outputs of the single-phase inverters onto the AC output line of the inverter circuit.

3. The power conversion apparatus according to claim 1, wherein
in the power running operation, when the voltage of the DC voltage source of the inverter circuit has exceeded the predetermined upper limit value, the control circuit increases the target voltage of the smoothing capacitor by a predetermined voltage, thereby increasing the current instruction.

4. The power conversion apparatus according to claim 1, wherein
the converter circuit is composed of two bridge circuits which are connected in parallel between the DC bus lines and each of which is composed of two semiconductor switching devices connected in series as the switches, and
a diode is connected in antiparallel to each of the semiconductor switching devices.

5. The power conversion apparatus according to claim 1, wherein
the power supply is an AC power supply, and
the control circuit
generates the current instruction based on a synchronized frequency of the AC power supply, thereby performing output control for the inverter circuit so as to improve the power factor of the AC power supply, and
when the voltage of the DC voltage source of the inverter circuit has exceeded the predetermined upper limit value, increases the amplitude of the synchronized frequency, thereby increasing the current instruction.

6. The power conversion apparatus according to claim 1, wherein
the control circuit
has a regeneration function for regenerating power from the smoothing capacitor to the power supply,
in operation of power regeneration from the smoothing capacitor, controls the converter circuit such that the DC voltage source of the inverter circuit discharges in the short-circuit period, and that the short-circuit period decreases as the voltage of the DC voltage source decreases and the short-circuit period increases as the voltage of the DC voltage source increases, and
in the operation of power regeneration, when the voltage of the DC voltage source of the inverter circuit has exceeded the predetermined upper limit value, decreases the target voltage of the smoothing capacitor by a predetermined voltage, thereby increasing the current instruction.

7. The power conversion apparatus according to claim 1, wherein
the power supply is an AC power supply, and
the control circuit generates the current instruction so as to improve the power factor of the AC power supply, thereby performing output control for the inverter circuit.

8. The power conversion apparatus according to claim 7, wherein the control circuit, in the power running operation,
when the voltage of the DC voltage source has decreased to be out of a predetermined voltage condition for enabling control for the inverter circuit using the current instruction, restricts the AC terminals of the converter circuit from being short-circuited, and
when the voltage of the DC voltage source has further decreased to be equal to or lower than a predetermined lower limit value, releases the short-circuit restriction of the AC terminals, thereby charging the DC voltage source.

9. The power conversion apparatus according to claim 1, wherein
the power supply is a DC power supply,
the target voltage of the smoothing capacitor is set to be higher than the voltage of the DC power supply, and
the voltage instruction value for the DC voltage source of the inverter circuit is set to be lower than the voltage of the DC power supply.

10. The power conversion apparatus according claim 1, wherein
the control circuit
has a regeneration function for regenerating power from the smoothing capacitor to the power supply, and
in operation of power regeneration from the smoothing capacitor, controls the converter circuit such that the DC voltage source of the inverter circuit discharges in the short-circuit period, and that the short-circuit period decreases as the voltage of the DC voltage source decreases and the short-circuit period increases as the voltage of the DC voltage source increases.

11. A power conversion apparatus comprising:
an inverter circuit composed of at least one single-phase inverter composed of a plurality of semiconductor switching devices and a DC voltage source, the at least one single-phase inverter having an AC side connected to a first terminal of a AC power supply;
a converter circuit having a plurality of converter switches connected between DC bus lines, one of AC terminals of the converter circuit being connected to an AC output line of the inverter circuit, and the other AC terminal of the converter circuit being connected to a second terminal of the power supply, the converter circuit providing an output of DC power between the DC bus lines;
a smoothing capacitor, connected between the DC bus lines, which smoothes the output of the converter circuit;
a control circuit which performs output control for the converter circuit so as to cause the voltage of the DC voltage source of the inverter circuit to follow an instruction value, by providing a short-circuit period for short-circuiting the AC terminals of the converter circuit to bypass the smoothing capacitor, and which performs output control for the inverter circuit so as to cause the voltage of the smoothing capacitor to follow a target voltage, by using a current instruction, wherein
the control circuit
in power running operation for outputting power to the smoothing capacitor, controls the converter circuit such that the DC voltage source of the inverter circuit is charged in the short-circuit period, and that the short-circuit period increases as the voltage of the DC voltage source decreases and the short-circuit period decreases as the voltage of the DC voltage source increases,
generates the current instruction based on a synchronized frequency of the AC power supply, thereby performing output control for the inverter circuit so as to improve the power factor of the AC power supply, and
in the power running operation, when the voltage of the DC voltage source of the inverter circuit has exceeded a predetermined upper limit value, changes the control for the inverter circuit by shifting the phase of the synchronized frequency by a predetermined angle, thereby increasing the discharge amount of the DC voltage source.

12. The power conversion apparatus according to claim 11, wherein
the control circuit
has a regeneration function for regenerating power from the smoothing capacitor to the power supply, and
in operation of power regeneration from the smoothing capacitor, controls the converter circuit such that the DC voltage source of the inverter circuit discharges in the short-circuit period, and that the short-circuit period decreases as the voltage of the DC voltage source decreases and the short-circuit period increases as the voltage of the DC voltage source increases.

13. The power conversion apparatus according to claim 11, wherein
the converter circuit is composed of two bridge circuits which are connected in parallel between the DC bus lines and each of which is composed of two semiconductor switching devices connected in series as the switches, and
a diode is connected in antiparallel to each of the semiconductor switching devices.

14. A power conversion apparatus comprising:
an inverter circuit composed of at least one single-phase inverter composed of a plurality of semiconductor switching devices and a DC voltage source, the at least one single-phase inverter having an AC side connected to a first terminal of a AC power supply;
a converter circuit having a plurality of converter switches connected between DC bus lines, one of AC terminals of the converter circuit being connected to an AC output line of the inverter circuit, and the other AC terminal of the converter circuit being connected to a second terminal of the power supply, the converter circuit providing an output of DC power between the DC bus lines;
a smoothing capacitor, connected between the DC bus lines, which smoothes the output of the converter circuit; and
a control circuit which performs output control for the converter circuit so as to cause the voltage of the DC voltage source of the inverter circuit to follow an instruction value, by providing a short-circuit period for short-circuiting the AC terminals of the converter circuit to bypass the smoothing capacitor, and which performs output control for the inverter circuit so as to cause the voltage of the smoothing capacitor to follow a target voltage, by using a current instruction, wherein
the control circuit
in power running operation for outputting power to the smoothing capacitor, controls the converter circuit such that the DC voltage source of the inverter circuit is charged in the short-circuit period, and that the short-circuit period increases as the voltage of the DC voltage source of the inverter circuit decreases and the short-circuit period decreases as the voltage of the DC voltage source increases, and
in the power running operation, when the voltage of the DC voltage source has decreased to be out of a predetermined voltage condition for enabling control for the inverter circuit using the current instruction, restricts the AC terminals of the converter circuit from being short-circuited, and when the voltage of the DC voltage source has further decreased to be equal to or lower than a predetermined lower limit value, releases the short-circuit restriction of the AC terminals, thereby charging the DC voltage source.

15. The power conversion apparatus according to claim 14, wherein
the converter circuit is composed of two bridge circuits which are connected in parallel between the DC bus lines and each of which is composed of two semiconductor switching devices connected in series as the switches, and
a diode is connected in antiparallel to each of the semiconductor switching devices.

16. The power conversion apparatus according to claim 14, wherein
the control circuit
has a regeneration function for regenerating power from the smoothing capacitor to the AC power supply, and
in operation of power regeneration from the smoothing capacitor, controls the converter circuit such that the DC voltage source of the inverter circuit discharges in the short-circuit period, and that the short-circuit period decreases as the voltage of the DC voltage source decreases and the short-circuit period increases as the voltage of the DC voltage source increases.

* * * * *